United States Patent
Mu et al.

(10) Patent No.: US 12,545,589 B2
(45) Date of Patent: Feb. 10, 2026

(54) CARBON-BASED POROUS MATERIAL AND PREPARATION METHOD AND USE THEREOF

(71) Applicants: China Petroleum and Chemical Corporation, Beijing (CN); Sinopec Research Institute of Safety Engineering, Qingdao (CN)

(72) Inventors: Shanjun Mu, Qingdao (CN); Yuxin Zhao, Qingdao (CN); Chunming Jiang, Qingdao (CN); Quanzhen Liu, Qingdao (CN); Weihua Zhang, Qingdao (CN); Lin Wang, Qingdao (CN); Shucai Zhang, Qingdao (CN); Xiaodong Mu, Qingdao (CN)

(73) Assignees: China Petroleum and Chemical Corporation, Beijing (CN); Sinopec Research Institute of Safety Engineering, Qingdao (CN)

( * ) Notice: Subject to any disclaimer, the term of this patent is extended or adjusted under 35 U.S.C. 154(b) by 1235 days.

(21) Appl. No.: 17/160,525

(22) Filed: Jan. 28, 2021

(65) Prior Publication Data
US 2021/0188649 A1 Jun. 24, 2021

Related U.S. Application Data

(62) Division of application No. 15/779,939, filed as application No. PCT/CN2017/086132 on May 26, 2017, now Pat. No. 11,161,745.

(30) Foreign Application Priority Data

Jul. 22, 2016 (CN) .......................... 201610586010.7
Apr. 26, 2017 (CN) .......................... 201710283939.7

(51) Int. Cl.
*C01B 32/336* (2017.01)
*B01J 20/20* (2006.01)
(Continued)

(52) U.S. Cl.
CPC ............. *C01B 32/336* (2017.08); *B01J 20/20* (2013.01); *B01J 20/28064* (2013.01);
(Continued)

(58) Field of Classification Search
None
See application file for complete search history.

(56) References Cited

U.S. PATENT DOCUMENTS

| 4,014,817 A | 3/1977 | Johnson et al. |
| 2014/0120339 A1 | 5/2014 | Nikova et al. |

(Continued)

FOREIGN PATENT DOCUMENTS

| CN | 101817524 A | 9/2010 |
| CN | 103447003 A | 12/2013 |

(Continued)

OTHER PUBLICATIONS

Bian et al.; CN101817524A; translation provided by Google Sep. 2024.*
(Continued)

*Primary Examiner* — Guinever S Gregorio
(74) *Attorney, Agent, or Firm* — FINNEGAN, HENDERSON, FARABOW, GARRETT & DUNNER LLP

(57) ABSTRACT

A carbon-based porous material microscopically exhibiting a three-dimension 1 cross-linked net-like hierarchical pore structure, a specific surface area of 500~2,500 m²/g and a water contact angle greater than 90°. The surface of the carbon-based porous material has a through hierarchical pore structure with mesopores nested in macropores and (Continued)

micropores nested in mesopores, the content of mesopores is high, and there are more adsorption activity sites exposed on the surface of the material, so that the diffusion path for organic gas molecules in the adsorption process is shortened. At the same time, the absorption and desorption rates may also be accelerated and the desorption temperature may be lowered. Furthermore, benefits result for solving the desorption and recovery problems of organic gas molecules. Moreover, the defects of ordinary porous carbon materials being easily hygroscopic, having a weakened capacity to adsorb target gas molecules in a humid environment, etc. are further effectively solved.

8 Claims, 8 Drawing Sheets

(51) Int. Cl.
*B01J 20/28* (2006.01)
*B01J 20/30* (2006.01)
*B01J 20/32* (2006.01)
*B01J 20/34* (2006.01)
*C01B 32/324* (2017.01)
*C01B 32/36* (2017.01)

(52) U.S. Cl.
CPC ..... *B01J 20/28066* (2013.01); *B01J 20/2808* (2013.01); *B01J 20/28083* (2013.01); *B01J 20/30* (2013.01); *B01J 20/324* (2013.01); *B01J 20/3416* (2013.01); *C01B 32/324* (2017.08); *C01B 32/36* (2017.08); *C01P 2006/12* (2013.01); *C01P 2006/16* (2013.01)

(56) References Cited

U.S. PATENT DOCUMENTS

| | | |
|---|---|---|
| 2014/0227325 A1* | 8/2014 | Naskar ............... B01J 20/3078 |
| | | 502/418 |
| 2015/0329364 A1 | 11/2015 | Dong et al. |
| 2015/0350199 A1 | 12/2015 | You |
| 2016/0031713 A1 | 2/2016 | Fish et al. |

FOREIGN PATENT DOCUMENTS

| | | |
|---|---|---|
| CN | 102989414 A | 9/2014 |
| CN | 106040178 A | 10/2016 |
| EP | 2921468 A1 | 9/2015 |
| WO | WO2009/057902 A1 | 5/2009 |
| WO | WO2012/006973 A1 | 1/2012 |

OTHER PUBLICATIONS

Li et al.; CN105080508A; translation provided by Google Sep. 2024.*
Wang et al.; Preparation of Microporous Molding Activated Carbon Derived from Bamboo Pyrolysis Gasification Byproducts for Toluene Gas Adsorption; Materials; 16, 5236; 2023.*
Berkem et al.; J. JOTCSA.; 11(1): 171-188; 2024.*
Niu et al.; Energy 100; 238-250; 2016.*
Supplementary European Search Report for Application No. EP17830296, dated Mar. 19, 2020.
Chang, Yun-Min et al, "Synthesis of large surface area carbon xerogels for electrochemical double layer capacitors," Journal of Power Sources, vol. 223, pp. 147-154 (2013).
International Search Report for International Application No. PCT/CN2017/086132 mailed Aug. 23, 2017.
Fu Xiaoyan, "Preparation of carbon aerogel/metal oxide composites and the study of their electrochemical properties thereof," Doctoral Dissertation Southwest University of Science and Technology (2015).

* cited by examiner

CARBON-BASED POROUS MATERIAL AND PREPARATION METHOD AND USE THEREOF

This application is a divisional application of U.S. application Ser. No. 15/779,939, filed on May 30, 2018, which is the United States National Stage Entry under 35 U.S.C. § 371 of International Application No. PCT/CN2017/086132 filed on May 26, 2017, which claims priority to Chinese Patent Application Nos. 201610586010.7 filed on Jul. 22, 2016, and 201710283939.7, filed on Apr. 26, 2017. The content of these applications are incorporated herein by reference in their entireties.

FIELD OF THE INVENTION

The present invention relates to a carbon-based porous material, a preparation method and a use of the carbon-based porous material.

BACKGROUND OF THE INVENTION

Carbon-based porous materials are widely used, for example, as adsorbents and catalyst carriers, etc. in industry.

Refined oil products have a phenomenon of volatilizing loss or even leakage inevitably in many links in storage and transportation. According to the field measurement results obtained by petroleum companies in USA, light refined oil products have at least 0.18% volatilization loss per handling, and the overall loss percentage of oil vapor in fuel stations is as high as 0.335%. Estimated on that basis, the total volatilization loss of gasoline in each receiving and distribution process in China is as high as $3.24\times10^5$ tons in each year, resulting in direct loss of over RMB 1 billion. Owing to the special characteristics of volatilization and leakage approaches of refined oil products (most approaches are hermetic and centralized), it is very convenient to recover volatilized or leaked oil centrally.

The oil vapor adsorption recovery technique is an oil vapor recovery technique that is the most matured in technology, is used the most widely, involves the lowest energy consumption, and attains the best recovery effect at present. That technique mainly employs pressure swing adsorption (PSA) process and absorption technique in combination. It utilizes the PSA process to concentrate volatilized low-boiling organic gas molecules, and then utilizes a solvent for assimilating recovery. The adsorbent is the core of the adsorption technique, and its performance indexes have direct influence on the entire process. An adsorbent that has high selectivity and high separation ratio is helpful for reducing equipment dimensions and cost of investment, etc. Porous activated carbon has a great advantage in adsorption owing to the abundant microporous structures in it. However, in the actual operations for VOCs pollution control, since most of the organic matters have strong polarity and relatively high boiling point, a desorption process becomes especially important. Mesoporous channels have a great influence on internal diffusion in the activated carbon absorption/desorption process, and have a decisive effect on the speed of the absorption/desorption process and even on the cyclic processing capability of the equipment. The activated carbon commonly used at present often results in problems such as low adsorption efficiency of light hydrocarbon gasoline components (C2-C5), high adsorption temperature rise (causing a flammable and explosive risk), difficulties in vacuum desorption (the desorption of high-boiling organic compounds, such as benzene, methyl benzene, and dimethyl benzene, etc., is difficult), and rapid degradation of adsorption performance, etc. as its micropore (<2 nm) content >80%. Moreover, the drawbacks of activated carbon adsorbent materials, such as poor hydrophobicity (resulting in water adsorption along with oil vapor adsorption) and easy efflorescence, etc., bring severe troubles to actual use. Therefore, how to prepare high-performance mesoporous activated carbon in a better way at a lower cost is a key and a challenge in the future research on adsorbents for VOCs pollution control. U.S. Pat. No. 4,014,817A discloses a porous activated carbon material specially used for organic gas adsorption recovery, i.e., Calgon Activated Carbon imported from USA, which occupies the highest market share in Chinese domestic market presently, characterized in that the activated carbon material is prepared from coal, with an activator such as zinc oxide, phosphoric acid, or sulfuric acid, etc., through an oxidative activation method at a high temperature, and is used in the adsorption recovery field of various organic gasses, including gasses exhausted in production of chemical products, oil vapor/air mixtures produced in storage, transportation and distribution of refined oil products, and associated gasses from oil fields, etc. The specific surface area of the activated carbon material is >1,000 $m^2/g$, the total pore volume is 0.5~0.8 $cm^3/g$, the mesopore percentage is 10%~25%, the most probable pore size distribution is 0.5~3.5 nm, and the ball-pan hardness number range is 90~93%. The activated carbon material has strong adsorption capacity for gasoline vapor, and the cyclically stabilized adsorption quantity is 20~35 g/100 g. However, the activated carbon material hasn't solve the problems of high initial adsorption temperature rise, low desorption efficiency (<60%), poor tolerance to humid environment (tends to absorb moisture), and rapid degradation in cyclic use, etc. Moreover, a large quantity of industrial waste water is produced in activation with an inorganic acid or alkali in the actual industrial process, resulting in strong impacts on the ecological environment.

SUMMARY OF THE INVENTION

In view of the drawbacks of existing active carbon products, such as high adsorption heat, high difficulties in vacuum desorption, and poor hydrophobicity, etc., the technical problem to be solved in the present invention is to provide a hydrophobic carbon-based porous material that has lower adsorption heat and involves lower difficulties in vacuum desorption, and a preparation method and a use of the carbon-based porous material.

To solve the above problem, the present invention provides a carbon-based porous material, which exhibits a structure of 3D hierarchical porous network microscopically, has 500~2,500 $m^2/g$ specific surface area and a water contact angle greater than 90°.

The present invention further provides a use of the carbon-based porous material in oil vapor adsorption and recovery.

The present invention further provides a preparation method of the carbon-based porous material, which comprises: controlling aldehyde, phenolic compound, and organic carboxylic acid to have a contact reaction under conditions of poly-condensation reaction to obtain sol-gel, and then drying the obtained sol-gel by freeze drying and carbonization-activation in sequence, wherein, the phenolic compound is one or more of cresol, phenol, resorcinol, phloroglucinol, pyrocatechol and pyrogallol, the acid is one or more of formic acid, glacial acetic acid, oxalic acid, butanedioic acid, phosphoric acid, hydrochloric acid, benzoic acid and phenylacetic acid, and the aldehyde is one or more of formaldehyde, acetaldehyde, benzaldehyde and propionaldehyde.

The present invention further provides another preparation method of the carbon-based porous material, which comprises the following steps:
(A) uniformly mixing carbon powder, a starter culture and water, and then fermenting;
(B) mixing the fermented product with water and a binder, and then crosslinking and curing the mixture;
(C) shaping and drying the crosslinked and cured product;
(D) carbonizing and activating the dried product.

The surface of the carbon-based porous material provided in the present invention has perforating hierarchical porous structures, in which macropores surround mesopores and mesopores surround micropores, and the mesopore content is high. With such hierarchical porous structures consisting of macropores, mesopores and micropores, more adsorption activity sites are exposed on the surface of the material, so that the diffusion paths of organic gas molecules are shortened in the adsorption process, the adsorption/desorption rate is increased, the desorption temperature is decreased, and the problem of desorption recovery of organic gas molecules can be solved more easily. The product provided in the present invention has outstanding performance indexes of organic gas adsorption recovery, for example, the butane adsorption capacity is up to 21.7 g/100 g, the temperature rise may be lower than 70° C., and the desorption efficiency at the vacuum degree commonly used in industry is 1.5 times of the desorption efficiency of conventional commercial activated carbon materials. The carbon-based porous material product provided in the present invention eliminates the defects of existing commercial activated carbon materials, including poor organic gas desorption performance, severe adsorption heat, and easy efflorescence in long-time cyclic operation, etc.; in addition, the product effectively overcomes the drawbacks of ordinary porous carbon materials, including easy moisture absorption and weakened adsorption capacity for target gas molecules in a humid environment, etc. The novel carbon-based porous material prepared in the present invention is a low-cost and high-performance product, which is especially suitable for oil vapor recovery field, and has good industrial prospects and high social and economic values.

The preparation method provided in the present invention uses a cheap and pollution-free activator (e.g., water vapor, $CO_2$, etc.) for activation, and thereby simplifies the production process and avoids environmental pollution in the production process. Through hydrophobic modification, the activated carbon exhibits good hydrophobicity; thus, the occurrence of absorbability degradation of the activated carbon resulted from adsorption of moisture in the air can be effective prevented in long-time use of the activated carbon. Therefore, such a material has wide industrial applicability and good commercialization prospects. Through cooperation and coordination among the above steps, the carbon-based porous material prepared with the method has high adsorption/desorption performance, high hydrophobicity and high mechanical strength, and thereby solves the problems of the existing activated carbon materials, including high adsorption heat, high difficulties in vacuum desorption, easy degradation in cyclic use, and poor hydrophobicity, etc. All the experimental data in the present invention is obtained at 100 kg production level. The production can be scaled up according to the specific circumstances in an actual mass production process.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The carbon-based porous material provided in the present invention exhibits a structure of 3D hierarchical porous network.

In the present invention, structure of 3D hierarchical porous network is an international general term, in which means that the carbon-based porous material is in an overall 3D crosslinked network structure, wherein, the porous structures in the network structure are perforating hierarchical porous structures (i.e., hierarchical through-holes), in which macropores surround mesopores and mesopores surround micropores.

Figure 10:
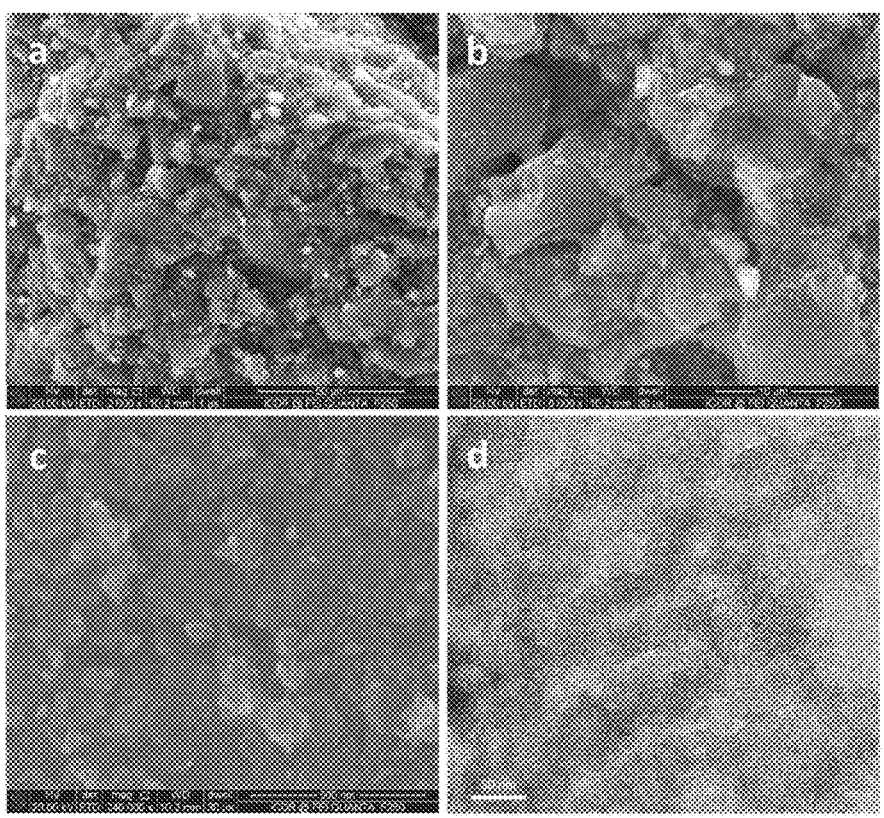
FIG. 10 shows SEM photos and a TEM photo of the carbon-based porous material prepared in the Comparative Example II-1, wherein, a, b and c are SEM photos at different magnifications respectively, and d is a TEM photo.
Figure 11:
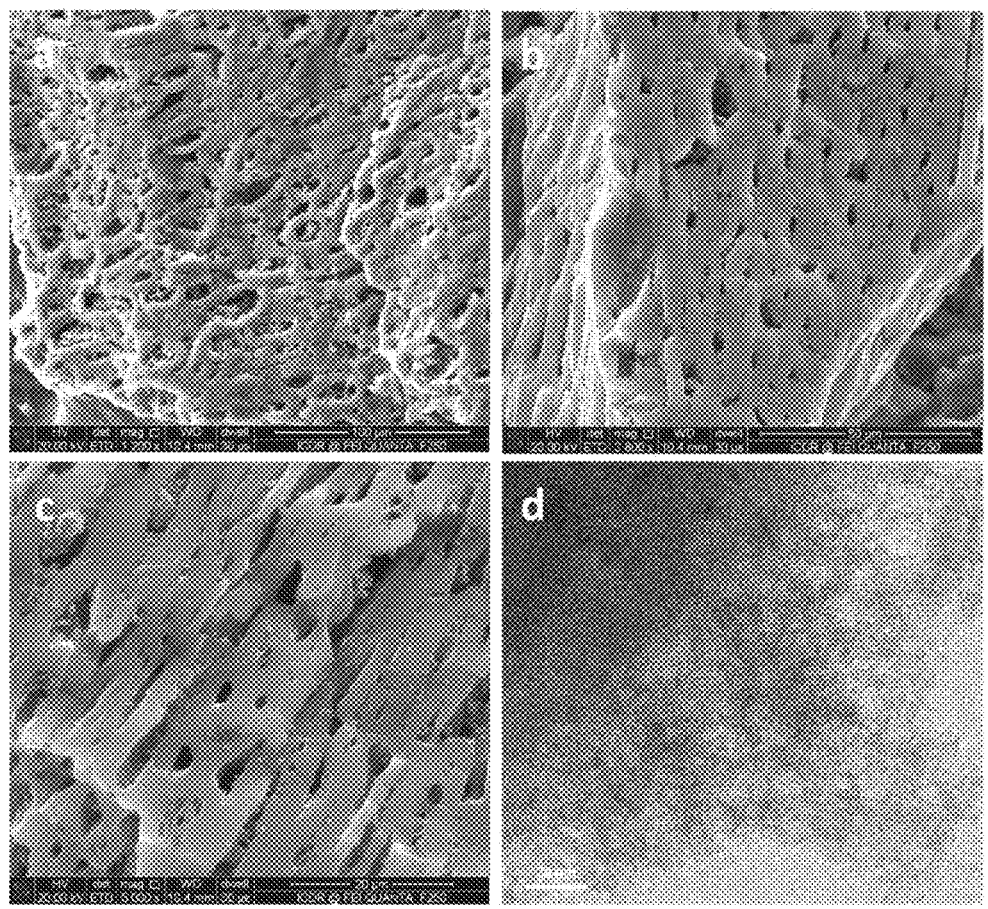
FIG. 11 shows SEM photos and a TEM photo of the carbon-based porous material prepared in the Comparative Example II-2, wherein, a, b and c are SEM photos at different magnifications respectively, and d is a TEM photo.

In the present invention, the microscopic structure of 3D hierarchical porous network and through-hole features can be observed conveniently in Scanning Electron Microscope (SEM) photos and Transmission Electron Microscope (TEM) photos respectively, and can be proved in BET analysis. For example, FIGS. 1, 7, 8 and 9 show SEM photos and TEM photos of the carbon-based porous materials prepared in the Example I-1, Example I-3, Example I-5, and Example II-1 respectively. It is seen from the photos: the surface of the material has a large quantity of interpenetrating super-macroporous structures, and a large quantity of mesoporous-microporous structures exist in the super-macropores or on the surfaces of the super-macropores; through BET analysis, it is also proved that the material has abundant mesoporous structures. FIGS. 2, 10 and 11 shows SEM and TEM photos of the carbon-based porous materials prepared in the Comparative Example I-1, Comparative Example II-1 and Comparative Example II-2 respectively. It can be seen from FIGS. 2 and 10, the carbon-based porous material prepared with the method in the prior art doesn't have a structure of 3D hierarchical porous network. FIG. 11 demonstrates that a carbon-based porous material obtained without fermentation also doesn't have a structure of 3D hierarchical porous network.

The mesopore content in the carbon-based porous material prepared in the present invention is not lower than 30%, preferably is not lower than 40%, and is not higher than 70%, preferably is not higher than 60%, e.g., 39.3%, 41.1%, 41.2%, 42.6%, 42.71%, 45.55%, 45.64%, 47.5%, 48.0%, 48.3%, 48.7%, 49.6%, 50.6%, 51.2%, 51.3%, 53.2%, 54.3% or 55.6%.

According to a preferred embodiment of the present invention, the macropore content in the carbon-based porous material is not lower than 1%, preferably is not lower than 3%, and is not higher than 10%, preferably is not higher than 8%, e.g., 1.2%, 2.2%, 3.21%, 3.37%, 3.4%, 3.6%, 3.72%, 3.85%, 3.97%, 4.06%, 4.1%, 4.12%, 4.26%, 4.33%, 5.18%, 5.21%, 5.34%, 5.73% or 8.3%.

The content of micropores is not lower than 20%, preferably is not lower than 35%, and is not higher than 65%, preferably is not higher than 60%, e.g., 41.85%, 42.2%, 44.58%, 45.59%, 45.6%, 46%, 46.4%, 46.66%, 47.03%, 47.7%, 48.17%, 48.5%, 50.19%, 50.64%, 52.08%, 52.22%, 52.4%, 54.84%, 55.17%, 55.2% or 56.2%.

For a specific carbon-based porous material product, the sum of contents of macropores, mesopores and mesopores is 100%.

The specific surface area of the carbon-based porous material provided in the present invention is 500~2,500 $m^2/g$, preferably is 500~2,300 $m^2/g$, more preferably is 600~2,000 $m^2/g$, further preferably is 600~1,000 $m^2/g$.

According to a preferred embodiment of the present invention, the BJH adsorption average pore size of the carbon-based porous material is 1~7 nm, preferably is 3~6.5 nm, and the most probable pore size is 1.7~3.8 nm.

According to a preferred embodiment of the present invention, the ball-pan hardness number of the carbon-based porous material is not lower than 90%, preferably is 93~98%.

According to a preferred embodiment of the present invention, the crushing strength of the carbon-based porous material is not lower than 90N/$cm^2$, preferably is 100~200N/$cm^2$.

According to a preferred embodiment of the present invention, the water contact angle of the carbon-based porous material is greater than 90°, preferably is greater than 110°, more preferably is greater than or equal to 115°, further preferably is greater than 120° and smaller than or equal to 150°, still farther preferably is 125~145°, more preferably is 135~145°.

According to a preferred embodiment of the present invention, the butane adsorption activity of the carbon-based porous material at normal temperature is greater than 15 g/100 g, preferably is 16~35 g/100 g.

According to a preferred embodiment of the present invention, the butane desorption rate of the carbon-based porous material is not lower than 55%, preferably is not lower than 60%, further preferably is 60~78%.

According to a preferred embodiment of the present invention, the adsorption heat (also referred to as adsorption temperature rise) of the carbon-based porous material is not higher than 85° C., preferably is not higher than 80° C., further preferably is 50~75° C.

According to a preferred embodiment of the present invention, the specific surface area of the carbon-based porous material is 500~2,300 $m^2/g$, the content of mesopores is 30~70%, the carbon-based porous material exhibits a structure of 3D hierarchical porous network microscopically, the pore size of mesopores is 2~60 nm, and the most probable pore size is 1.7~3.8 nm, and the water contact angle of the carbon-based porous material is greater than 120°.

According to another preferred embodiment of the present invention, the bulk density of the carbon-based porous material is 0.45~0.65 g/$cm^3$, the specific surface area is 1,200~2,500 $m^2/g$, preferably is 1,300~2,400 $m^2/g$, the content of mesopores is 30~60%, preferably is 35~58%, the content of micropores is 35~60%, preferably is 40~55%, the content of macropores is 1~10%, preferably is 2~6%, the pore size distribution is 1~5 nm, the most probable pore size is 1~5 nm, preferably is 1.5~3 nm, the ball-pan hardness number is not lower than 90%, preferably is 91~98%, the crushing strength is 150~200N/cm, preferably is 160~200N/cm, the water contact angle is greater than 110° and smaller than or equal to 140°, the butane adsorption activity is 26~36 g/100 g, the butane desorption efficiency is 60~80%, preferably is 65~75%, the adsorption heat is not higher than 80° C., preferably is 60~75° C.

According to another preferred embodiment of the present invention, the bulk density of the carbon-based porous material is 0.35~0.45 g/$cm^3$, the specific surface area is 600~1,000 m²/g, preferably is 650~950 m²/g, more preferably is 650~850 m²/g, the content of mesopores is 30~60%, preferably is 40~55%, the content of micropores is 35~60%, preferably is 40~55%, the content of macropores is 1~10%, preferably is 2~6%, the pore size distribution is 1~10 nm, the most probable pore size is 1~5 nm, preferably is 1.5~2.5 nm, the ball-pan hardness number is not lower than 85%, preferably is 90~98%, the crushing strength is 100~200N/cm, preferably is 120~190N/cm, the water contact angle is 120~150°+1.5°, the butane adsorption activity is 15~30 g/100 g, the butane desorption efficiency is 53~80%, preferably is 60~75%, the adsorption heat is not higher than 80° C., preferably is 55~70° C.

In the present invention, the structural parameters of the pores, including BJH adsorption average pore size, specific surface area, pore volume of mesopores, pore volume of micropores, pore volume of macropores, and the most probable pore size, etc., are measured with a BET nitrogen adsorption method.

In the present invention, the mesopore content is expressed as a ratio of pore volume of mesopores to total pore volume of the pores, the macropore content is expressed as a ratio of pore volume of macropores to total pore volume of the pores, and the micropore content is expressed as a ratio of pore volume of micropores to total pore volume of the pores.

In the present invention, the ball-pan hardness number is measured with the method defined in GB/T20451-2006 Test Method for Ball-Pan Hardness of Activated Carbon. The ball-pan hardness number represents a wear resistant property.

In the present invention, the crushing strength is measured with the method defined in GB/T7702.3-2008 Test Method for Granular Activated Carbon from Coal-Determination of Hardness. The crushing strength represents a compression resistant property of the product when the product is stacked in a can.

In the present invention, the water contact angle is measured with an OCA20 contact angle tester from Dataphysics (a German company). Specifically, the testing method is as follows: the sample is placed on a test bench, a 5 μL liquid drop is transferred with a syringe needle to the tested surface, the liquid drop and the plastic surface are displayed in a computer image by imaging with an optical camera, and the contact angle between the liquid drop and the contact surface is calculated. The test is repeated for 5 times, and the average value of the measurements obtained in the tests is taken as the water contact angle.

In the present invention, the butane adsorption activity at normal temperature and the butane working capacity at normal temperature are measured with the test method defined in GB/T20449-2006. The butane adsorption activity represents the adsorption capacity of the adsorbent (i.e., the carbon-based porous material in the present invention). The butane working capacity represents the desorption capability of adsorbed butane through a desorption process.

Butane desorption efficiency=butane working capacity/butane adsorption activity ×100%. It is seen from the formula: the butane desorption efficiency is closely related with recovery of the adsorbate. The carbon-based porous material provided in the present invention has a high desorption efficiency, and thereby makes effective recovery of absorbed gasses possible.

In the present invention, the adsorption heat of the carbon-based porous material is measured with a direct heat measurement method, specifically through the following steps: 500 g dry sample of the carbon-based porous material (with moisture content not higher than 4 wt %) is loaded into an adsorption column to 33 cm filling height, nitrogen is charged into the adsorption column at 300 mL/min. flow rate for 30 min., and then butane gas is charged into the adsorption column at 250 mL/min. flow rate, and the adsorption heat is measured by measuring the central part of the adsorption column with a resistive temperature detector, thermocouple or semiconductor thermosensitive element at 5 min. temperature acquisition interval, and a curve of temperature vs. time is recorded. The peak temperature point in the curve represents the adsorption heat of the carbon-based porous material. Usually, the higher the adsorption heat is, the higher the temperature rise will be, the higher a flammable and explosive risk will be, and the poorer the use safety of the product will be. For a gasoline adsorbent, the warning limit of adsorption heat is 90° C.; if the adsorption heat exceeds 90° C., extra measures must be taken to prevent the occurrence of any safety accident.

The carbon-based porous material provided in the present invention exhibits a structure of 3D hierarchical porous network microscopically, which is a multi-level pore distribution structure in which macropores surround mesopores and mesopores surround micropores. Therefore, the surface of the material has high specific surface area, high mesopore distribution ratio, and high mechanical strength. Thus, the carbon-based porous material is applicable to the adsorption recovery process in VOCs control, and exhibits strong adsorption capacity and desorption capacity in the actual VOCs adsorption process. The carbon-based adsorbent material provided in the present invention can also be used as a catalyst carrier, and can be applied in a variety of water treatment processes.

In the present invention, the carbon-based porous material preferably is activated carbon.

The specific surface area of the carbon-based porous material product in the present invention can be regulated and controlled accurately within a range of 600~2,000 m²/g, the mesopore percentage is 40~60%, the ball-pan hardness number is higher than 90% generally, the maximum crushing strength is up to 180N/cm or higher, and the hydrophobic angle is greater than 130°.

The carbon-based porous material provided in the present invention may be prepared through three major procedures executed sequentially, i.e., raw material pre-mixing, shaping and drying, and carbonization-activation. To further improve hydrophobicity of the carbon-based porous material, preferably the method further comprises a step of hydrophobic treatment after carbonization-activation.

According to a preferred embodiment of the present invention, the preparation method of the carbon-based porous material provided in the present invention comprises: controlling aldehyde, phenolic compound and organic carboxylic acid to have a contact reaction under conditions of poly-condensation reaction to obtain sol-gel, and then drying the obtained sol-gel by freeze drying and carbonization-activation in sequence.

In the present invention, the phenolic compound is one or more of cresol, phenol, resorcinol, phloroglucinol, pyrocatechol and pyrogallol, preferably is one or more of pheol, cresol, pyrocatechol and pyrogallol. The cresol preferably is m-methylphenol.

In the present invention, the acid is one or more of formic acid, acetic acid, oxalic acid, butanedioic acid, phosphoric acid, hydrochloric acid, benzoic acid and phenylacetic acid, preferably is organic carboxylic acid among the above acids, further preferably is glacial acetic acid.

In the present invention, the aldehyde is one or more of formaldehyde, acetaldehyde, benzaldehyde and propionaldehyde, preferably is formaldehyde.

According to a preferred embodiment of the present invention, the contact reaction among the aldehyde, the phenolic compound and the acid is executed by mixing the phenolic compound with a water solution of the aldehyde, and then adding the acid into the mixture and stirring and mixing till the mixture is cured into gel.

Preferably, the concentration of the water solution of the aldehyde is 20~30 mol/L, preferably is 23~26 mol/L. Or, preferably the concentration of the water solution of the aldehyde is 10~40 wt %.

According to an embodiment of the present invention, the mass ratio of aldehyde to phenolic compound is 1~5, preferably is 1.2~2.5, e.g., 1.48, 1.5, 1.74 or 2.17.

According to an embodiment of the present invention, the mass ratio of the aldehyde to the acid is 10~100, preferably is 20~60, more preferably is 30~55, e.g., 34.8, 40, 42.5, 45, or 48.1.

According to an embodiment of the present invention, the conditions of the poly-condensation reaction include: temperature: 60~120° C., preferably 70~100° C.; time: longer than 12 h, preferably is 20~80 h.

According to an embodiment of the present invention, the freeze drying comprises pre-freezing at −196~−180° C. for a duration equal to or shorter than 1 min. (preferably equal to or shorter than 50 s, further preferably 4~50 s), and then drying under conditions of −70° C. or lower temperature (preferably −80° C. or lower temperature) and 3~10 Pa vacuum degree. In the present invention, the vacuum degree is measured with a vacuum gauge. Preferably, the freeze drying is executed in a vacuum freeze drying furnace.

The carbon-based porous material may be formed into required shape and size by using an appropriate freeze drying mold, to meet the actual application requirements. For example, a cylindrical freeze drying mold in 4~5 mm diameter may be used to obtain a product of the carbon-based porous material in a cylindrical form in 4~5 mm diameter.

According to a preferred embodiment of the present invention, the carbonization-activation comprises a carbonization stage and an activation stage. The carbonization is executed under inert gas shielding, the carbonization temperature is 550° C. or higher, preferably is 600° C. or higher, more preferably is 600~800° C.; the carbonization time is longer than 2 h, preferably is longer than 3 h, more preferably is 3~6 h. Preferably, an inert gas is charged continuously in the entire carbonization process.

Preferably, the heating rate for heating up to the temperature required for the carbonization is <10° C./min., preferably is 2~9.5° C./min., more preferably is 3~9° C./min.

In the present invention, the inert gas is one or more of a group zero element in the periodic table of elements and nitrogen.

In the present invention, the activation is executed in a carbon dioxide gas atmosphere or a mixed gas atmosphere that mainly consists of carbon dioxide, and the activation temperature is higher than 800° C., preferably is 850~1,100° C.

It is proved in experiments: the longer the activation time is, the larger the specific surface area of the obtained product will be, and the total pore volume and the pore volume of micropores begin to decrease after 4 h. Therefore, preferably the activation time in the present invention is longer than 3 h, more preferably is 3~8 h.

The mixed gas preferably is a mixture of carbon dioxide and nitrogen, wherein, the concentration of carbon dioxide in the mixture is not lower than 50 vol %, preferably is not lower than 80 vol %.

According to a preferred embodiment of the present invention, the carbonization-activation are executed in the same reaction furnace, which preferably is one of tubular heating furnace, high-temperature carbonization bed, and muffle furnace. Further preferably, the temperature is directly increased to the activation temperature after carbonization, and the atmosphere in the reaction furnace is changed or not changed, and then the activation reaction is executed.

Preferably, the heating rate for heating up to the temperature required for the activation is <10° C./min., preferably is 2~9.5° C./min., more preferably is 3~9° C./min.

The heating rate in the carbonization procedure and the heating rate in the activation procedure may be identical or different.

According to a specific embodiment of the present invention, the preparation method of the carbon-based porous material comprises the following steps:

(1) mixing phenolic compound, with a water solution of formaldehyde first, and then adding glacial acetic acid into the mixture, and stirring and mixing uniformly;

(2) stirring the mixed solution obtained in the step (1) continuously till the mixture is cured, and then pre-freezing the mixture to a temperature equal to or lower than −70° C., and loading the mixture into a vacuum freeze drying furnace and drying it to remove water;

(3) loading the gel block obtained in the freeze drying step into a carbonization-activation device, purging all air in a carbonization tube in the reactor and then charging an inert shielding gas into the carbonization tube, increasing the temperature in the reaction furnace to 550° C. or above and keeping at the temperature for 2 h or longer time for reaction, while keeping continuous inert gas charging;

(4) increasing the reaction temperature after the reaction is completed, removing the inert shielding gas atmosphere and charging an activator into the reactor for 2 h or longer time for activation, and then taking out the product after the product is cooled to room temperature.

Preferably, the mixed solution stirring and curing time is >12 h.

Preferably, in the step 2), the temperature at which the stirring is executed continuously is 70~100° C.; the freeze drying time of the sample is >24 h; the heating rate in the reaction furnace is <10° C./min.; the inert shielding gas is nitrogen, and the temperature in the reaction furnace shielded in nitrogen atmosphere is 600~800° C.; the reaction time is 3~6 h; the activation temperature in carbon dioxide atmosphere is 850~1,100° C., and the activation time is 3~8 h.

The above preparation method requires a simple process, can regulate and control the morphology of the product easily, has good performance in cyclic use, is favorable for recovery and reuse, can be used in large-scale production, and is helpful for change of production of the product from laboratory preparation to industrial application. The obtained carbon-based porous material has good hydrophobicity (with a wetting) angle>120°, and the diffusion paths of the volatile organic compound molecules on the adsorption substrate are shortened owing to a micro-scale confinement effect resulted from the microscopic hierarchical porous structure; thus, the kinetic characteristics of adsorption/desorption is changed radically, so that the adsorption/desorption rate is increased, and the desorption temperature is decreased. Besides, owing to the unique features of the nanometer material, including large specific surface area, abundant internal cross-linked networks and microporous channels, the active sites and shape selectivity of the adsorbent are improved, the adsorption/separation efficiency is increased, high mechanical stability is realized, and a good technical effect is attained.

According to a preferred embodiment of the present invention, the bulk density of the carbon-based porous material obtained with the above method is 0.45~0.65 g/cm$^3$, the specific surface area is 1,200~2,500 m$^2$/g, preferably is 1,300~2,400 m$^2$/g, the content of mesopores is 30~60%, preferably is 35~58%, the content of micropores is 35~60%, preferably is 40~55%, the content of macropores is 1~10%, preferably is 2~6%, the pore size distribution is 1~5 nm, the most probable pore size is 1~5 nm, preferably is 1.5~3 nm, the ball-pan hardness number is not lower than 90%, preferably is 91~98%, the crushing strength is 150~200N/cm, preferably is 160~200N/cm, the water contact angle is greater than 110° and smaller than or equal to 140°, the butane adsorption activity is 26~36 g/100 g, the butane desorption efficiency is 60~80%, preferably is 65~75%, the adsorption heat is not higher than 80° C., preferably is 60~75° C.

Another preparation method of the carbon-based porous material provided in the present invention comprises the following steps:
  (A) uniformly mixing carbon powder, a starter culture and water, and then fermenting;
  (B) mixing the fermented product with water and a binder, and then crosslinking and curing the mixture;
  (C) shaping and drying the crosslinked and cured product;
  (D) carbonizing and activating the dried product.

In the present invention, preferably the carbon powder is porous plant carbon powder with abundant natural fibers, further preferably is one or more of coconut shell carbon powder, wood carbon powder, bamboo carbon powder, lotus root carbon powder, and straw carbon powder.

According to the present invention, the starter culture and the water are used to form a fermentation environment. Therefore, the starter culture may be any organic matter, preferably is starch, and further preferably is one or more of mung bean starch, cassava starch, sweet potato starch, Spanish potato starch, potato starch, wheat starch, water caltrop starch, lotus root starch, and maize starch. In the present invention, the water may be added additionally, or may be water carried in the starter culture; for example, if a fresh organic matter rich in water is used, the organic matter carries a large quantity of water.

According to a preferred embodiment of the present invention, the dose of the starter culture is 5~20 wt % of the carbon powder, preferably is 8~18 wt %, the dose of water is 1~3 times of the total weight of the organic matter and the carbon powder, preferably is 1.5~2.8 times.

In the present invention, the conditions of the fermentation include: temperature: 10~40° C.; time: 1~4 months, preferably 1~2 months; oxygen content: <10 vol %.

The fermentation may be executed in a fermenter, usually under an air-tight condition. Usually, it is unnecessary to carry out oxygen removing and charging operations for the fermenter in the fermentation process to attain oxygen content <10 vol %.

According to the present invention, in the step (B), the weight ratio of the product obtained through fermentation to the binder to the water preferably is 100:5~20:10~35, further preferably is 100:8~18:15~25. There is a detrimental effect to the strength of the obtained carbon-based porous material if the content of the binder is too low or too high.

In the present invention, preferably the binder is one or more of petroleum pitch, coal tar and coal pitch.

According to a preferred embodiment of the present invention, the conditions of the crosslinking and curing include: temperature: 50~100° C., preferably 60~90° C.; time: 20~80 min., preferably 30~60 min. Preferably, the crosslinking and curing is executed in a hydrothermal reactor.

Usually, from the mechanism, it is believed that a through-hole skeletal structure can be formed effectively through the fermentation in the step (A), so that the problems in the existing activated carbon materials, i.e., difficulties in desorption and high holding capacity after desorption, are solved. Through the crosslinking and curing in the step (B), the mechanical strength (e.g., wear resistance and compression resistance, etc.) of the carbon-based porous material can be remarkable improved, so that the problem of easy crushing and degradation of the existing activated carbon materials in the cyclic operation process is solved.

The forming method may be any conventional method, such as extruding method, layering strip method, or rolling-ball method, etc. According to a preferred embodiment of the present invention, the forming is plodding forming. The shape and size in the plodding forming may be selected according to the specific application. For example, the material may be plodded into a cylindrical form in 4~5 mm diameter. The temperature of drying after the plodding forming may be 70~100° C., and the time of drying may be 2~3 h.

In the present invention, the carbonization-activation preferably is carbonization-activation with water vapor. According to a preferred embodiment of the present invention, the conditions of the carbonization-activation include: temperature: 650~1,000° C., preferably 700~950° C.; time: 80~300 min., preferably 100~240 min. The heating rate is <10° C./min., preferably is 2~9.5° C./min., more preferably is 3~9° C./min. Preferably, an inert gas is charged continuously in the entire carbonization process.

In the present invention, the inert gas is one or more of a group zero element in the periodic table of elements and nitrogen.

It is proved in experiments: the longer the activation time is, the larger the specific surface area of the obtained product will be, and the total pore volume and the pore volume of micropores begin to decrease after 4 h. Therefore, preferably the activation time in the present invention is longer than 3 h, more preferably is 3~8 h.

The carbonization-activation is executed in an activation furnace. Preferably, the activation furnace comprises a preheating section (also referred to as a carbonization section) and an activation section; preferably the temperature in the preheating section is controlled at 650~750° C., and the preheating time is 5~15 min.; the temperature in the activation section is higher than that in the preheating section by 50~300° C. Preferably, the activation furnace is rotated at a constant speed. The activation furnace preferably is one of tubular heating furnace, high-temperature carbonization bed, and muffle furnace.

The activator preferably is water vapor and/or carbon dioxide gas at 150~200° C.

In relation to 100 g discharged product (i.e., the product obtained by drying as described previously), the dose of the activator preferably is 10~100 g, further preferably is 15~75 g. Preferably the activator is supplied by charging it continuously; in relation to 100 kg/h discharging rate of the product, the charging rate of the activator is 10~100 kg/h, further preferably is 15~75 kg/h. By charging the activator continuously, the carbon pores can be cleaned, so that the structural parameters of the carbon-based porous material, such as pore diameter structure and specific surface area, etc., are easy to regulate and control.

According to a preferred embodiment of the present invention, to further improve the hydrophobicity of the carbon-based porous material, preferably the method further comprises hydrophobic treatment of the carbonized and activated product obtained with either of the above methods, i.e., the method further comprises a hydrophobic treatment step after the carbonization-activation.

According to an embodiment of the present invention, the hydrophobic treatment method comprises controlling the activated product to contact with a silane coupling agent in the presence of a solvent. Preferably, the weight ratio of the product obtained through carbonization-activation to the silane coupling agent to the solvent is 100:1~5:100~200, more preferably is 100:1.5~4.5:120~180.

The silane coupling agent preferably is one or more of polydimethylsiloxane (also referred to as dimethyl silicon oil), vinylchlorosilane, vinyltriacetoxysilane, and γ-(methacryloxypropyl) trimethoxysilane. The polydimethylsiloxane preferably is polydimethylsiloxane with number-average molecular weight >50,000. The vinylchlorosilane preferably is one or more of dimethylvinylchlorosilane and dimethylvinyltrichlorosilane, etc.

The solvent for hydrophobic treatment may be any liquid substance that can dissolve the silane coupling agent, further preferably is a liquid substance that is less toxic to human body and easy to remove; preferably, the solvent is one or more of ethyl acetate, cyclohexane, n-hexane and acetone.

Further preferably, the solvent is ethyl acetate.

According to an embodiment of the present invention, the conditions of the contact between the product obtained through carbonization-activation and the silane coupling agent include: temperature: 50~70° C., preferably 55~65° C.; time: 12~20 h, preferably 15~18 h.

The contact method preferably is impregnating the product obtained through carbonization-activation with the silane coupling agent solution.

Preferably, the method provided in the present invention further comprises filtering and drying, after the product obtained through carbonization-activation contacts with the silane coupling agent. The conditions of the drying include: temperature: 80~200° C., preferably 100~150° C.; time: 1~10 h, preferably 2~8 h.

After the hydrophobic treatment executed by contacting with the silane coupling agent, the carbon-based porous material has better hydrophobicity, and the water contact angle is improved by 15~30°, and is about 150° now. Thus, the use scope of adsorption of the activated carbon is further expanded to cover humid environments.

The preparation method of the carbon-based porous material provided in the present invention utilizes inherent porous structures of natural products (e.g., coconut shells) and high-temperature water vapor activation, so that the micropore content in the carbon-based porous material is decreased from the original value that is >70% to a value that is <35%, the mesopore content is increased from the original value that is <30% to a value that is >60%, and the specific surface is increased from the original value that is <300 m$^2$/g to a value that is >900 m$^2$/g.

The carbon-based porous material prepared with the method provided in the present invention exhibits a structure of 3D hierarchical porous network microscopically, in which the macropore content is 1~10%, preferably is 3~8%, the micropore content is 20~65%, preferably is 35~60%, the mesopore content is 30~70%, preferably is 40~55%, the ball-pan hardness number of the carbon-based porous material is not lower than 85%, preferably is 90~98%, the crushing strength is 100~200N/cm, preferably is 120~190N/cm.

The mesopore content in the carbon-based porous material prepared with the method provided in the present invention is not lower than 30%, preferably is not lower than 40%, and is not higher than 70%, preferably is not higher than 55%, e.g., 39.3%, 41.1%, 42.6%, 42.71%, 45.55%, 45.64%, 47.5%, 48.0%, 49.6%, 51.2%, 51.3%, or 54.3%.

According to a preferred embodiment of the present invention, the macropore content in the carbon-based porous material is not lower than 1%, preferably is not lower than 3%, and is not higher than 10%, preferably is not higher than 8%, e.g., 3.21%, 3.37%, 3.72%, 3.85%, 3.97%, 4.06%, 4.12%, 4.26%, 4.33%, 5.18%, 5.21%, 5.34%, or 5.73%.

The content of micropores is not lower than 20%, preferably is not lower than 35%, and is not higher than 65%, preferably is not higher than 60%, e.g., 41.85%, 44.58%, 45.59%, 46.66%, 47.03%, 48.17%, 50.19%, 50.64%, 52.08%, 52.22%, 52.4%, 54.84%, or 55.17%.

According to another preferred embodiment of the present invention, the bulk density of the carbon-based porous material prepared with the above fermentation method is 0.35~0.45 g/cm$^3$, the specific surface area is 600~1,000 m$^2$/g, preferably is 650~950 m$^2$/g, more preferably is 650~850 m$^2$/g, the content of mesopores is 30~70%, preferably is 40~55%, the content of micropores is 35~65%, preferably is 40~60%, the content of macropores is 1~8%, preferably is 3~6%, the pore size distribution is 1~10 nm, the most probable pore size is 1~5 nm, preferably is 1.5~2.5 nm, the ball-pan hardness number is not lower than 85%, preferably is 90~98%, the crushing strength is 100~200N/cm, preferably is 120~190N/cm, the water contact angle is 120~150°+1.5°, the butane adsorption activity is 15~30 g/100 g, the butane desorption efficiency is 53~80%, preferably is 60~75%, the adsorption heat is not higher than 80° C., preferably is 55~70° C.

The carbon-based porous material provided in the present invention solves the problems of conventional activated carbon materials, including high adsorption temperature rise and difficulties in vacuum desorption, etc., and achieves butane adsorption activity greater than 20 g/100 g and butane holding capacity as lower as 5.45 g/100 g, while increasing specific active surface and adsorption capacity. The working capacity is apparently higher than the working capacity of imported commercial activated carbon materials specially used for organic gas recovery, and is 1.4 times of the latter. Furthermore, the carbon-based porous material in the present invention also exhibits high mechanical strength and high hydrophobicity. The carbon-based porous material provided in the present invention is especially suitable use for oil vapor adsorption recovery. The carbon-based porous material provided in the present invention may also be used as a carrier.

Hereunder the present invention will be further detailed in examples, but the scope of the present invention is not limited to those examples.

In the following examples, the specific surface area of sample, pore volume of mesopores, total pore volume, BJH adsorption average pore size, the most probable pore size, and pore size distribution are measured with a BET method. The microscopic structure of 3D hierarchical porous network is observed intuitively in Scanning Electron Microscope (SEM) photos and Transmission Electron Microscope (TEM) photos, and is further proved with the aid of BET analysis. The ball-pan hardness number is measured with the method defined in GB/T20451-2006 Test Method for Ball-Pan Hardness of Activated Carbon. The crushing strength is measured with the method defined in GB/T7702.3-2008 Test Method for Granular Activated Carbon from Coal-Determination of Hardness. The water contact angle is measured with an OCA20 contact angle tester from Dataphysics (a German company), specifically with the following testing method: The sample is placed on a test bench, a 5 μL liquid drop is transferred with a syringe needle to the tested surface, the liquid drop and the plastic surface are displayed in a computer image by imaging with an optical camera, and the contact angle between the liquid drop and the contact surface is calculated. The test is repeated for 5 times, and the average value of the measurements obtained in the tests is taken as the water contact angle. The butane working capacity at normal temperature and the butane adsorption activity at normal temperature are measured with the test method defined in GB/T20449-2006. Butane desorption efficiency=butane working capacity/butane adsorption activity×100%. The adsorption heat of the carbon-based porous material is measured with a direct heat measurement method, specifically through the following steps: 500 g dry sample of the carbon-based porous material (with moisture content not higher than 4 wt %) is loaded into an adsorption column to 33 cm filling height, nitrogen is charged into the adsorption column at 300 mL/min. flow rate for 30 min., and then butane gas is charged into the adsorption column at 250 mL/min. flow rate, and the adsorption heat is measured by measuring the central part of the adsorption column with a resistive temperature detector, thermocouple or semiconductor thermosensitive element at 5 min. temperature acquisition interval, and a curve of temperature vs. time is recorded. The peak temperature point in the curve represents the adsorption heat of the carbon-based porous material. The bulk density is measured with the testing method defined in GB/T23771-2009.

Example I-1

(1) 20 g pyrocatechol is dissolved in 40 ml 37% (mass fraction) formaldehyde solution, 0.9 g glacial acetic acid is added into the solution, and then the solution is stirred for 10 min, till it is in a homogeneous state.

(2) The mixed solution is stirred at 4,500 rpm constant speed for 72 h in 80° C. constant-temperature water bath environment, to obtain an orange gel block.

(3) The gel block is pre-frozen rapidly with liquid nitrogen for 30 s, and then is loaded into a −80° C., 5 Pa vacuum freeze drier and dried for 24 h, to obtain a dry sample.

(4) The dry sample is loaded into a tubular heating furnace, the air in the tube is removed and then nitrogen shielding gas is charged into the tube at 50 sccm charging rate, then the temperature in the reactor is increased at 5° C./min. heating rate to 750° C. and held at the temperature for 3 h, while continuous nitrogen charging is kept.

(5) The temperature is increased at 5° C./min. heating rate to 900° C. and held at the temperature for 5 h, while the initial nitrogen atmosphere is replaced with carbon dioxide gas for activation. After the activation is completed, the product is cooled to room temperature and then taken out; thus, a block of carbon-based porous material in the irregular block shape shown in FIG. 6 in dimensions of (1-2)cm×(1-2)cm×(1-5)cm is obtained.

Figure 1:
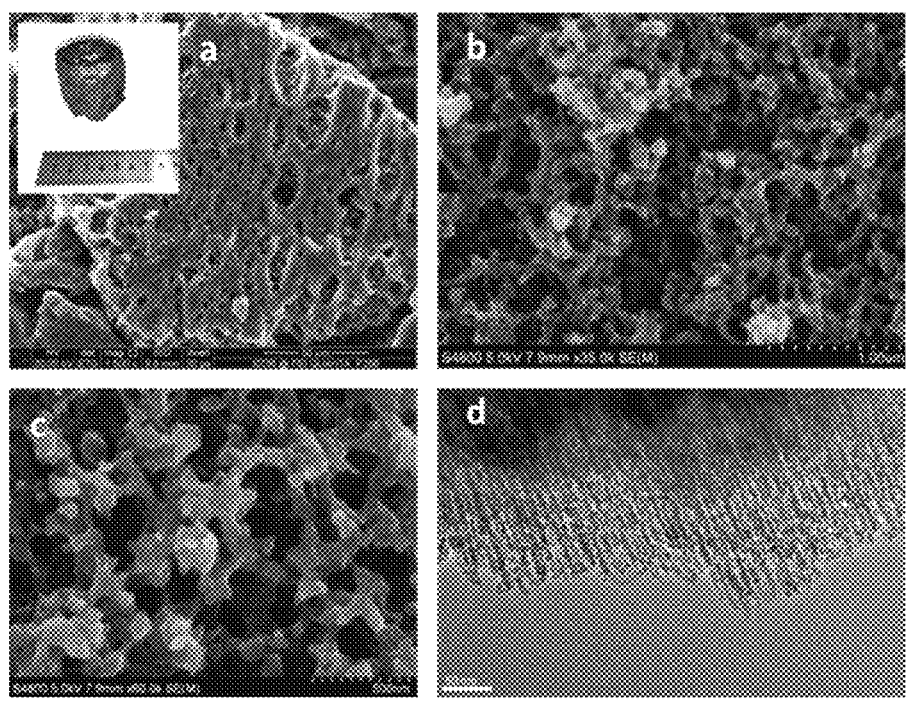
FIG. 1 shows Scanning Electron Microscope (SEM) photos and/or a Transmission Electron Microscope (TEM) photo of the carbon-based porous material prepared in the Example I-1, wherein, a, b and c are SEM photos at different magnifications respectively, and d is a TEM photo.
Figure 2:
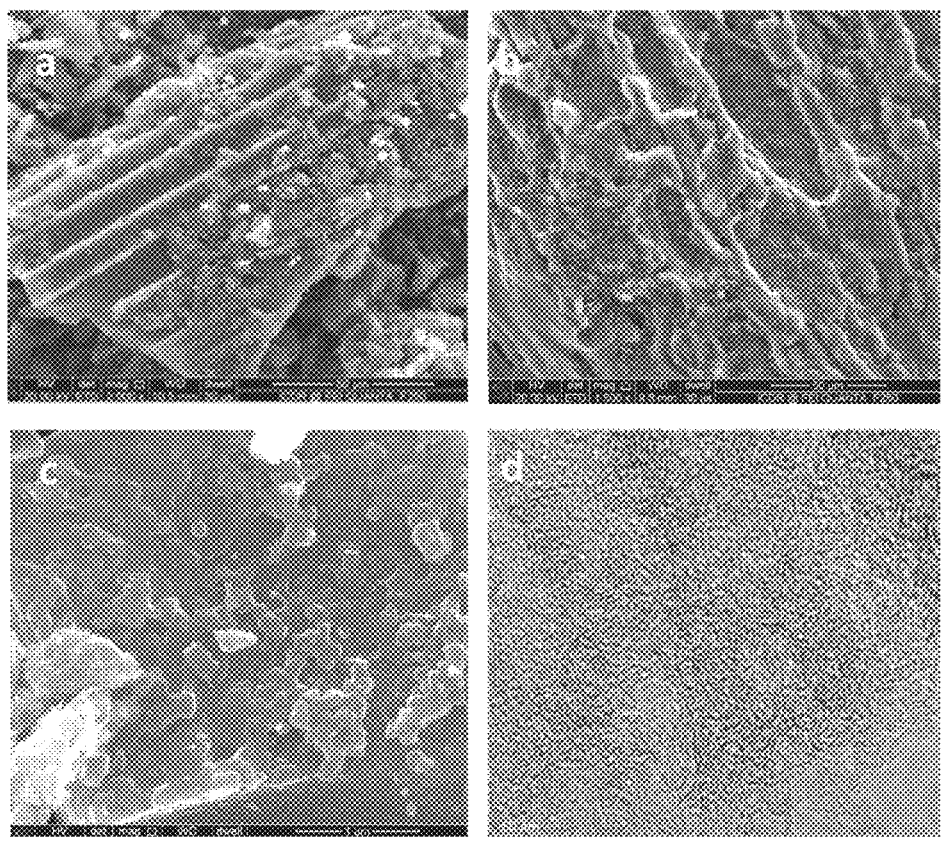
FIG. 2 shows SEM photos and/or a TEM photo of the carbon-based porous material obtained in the Comparative Example I-1, wherein, a is a side-view SEM photo, b and c are SEM photos at different magnifications respectively, and d is a TEM photo.
Figure 3:
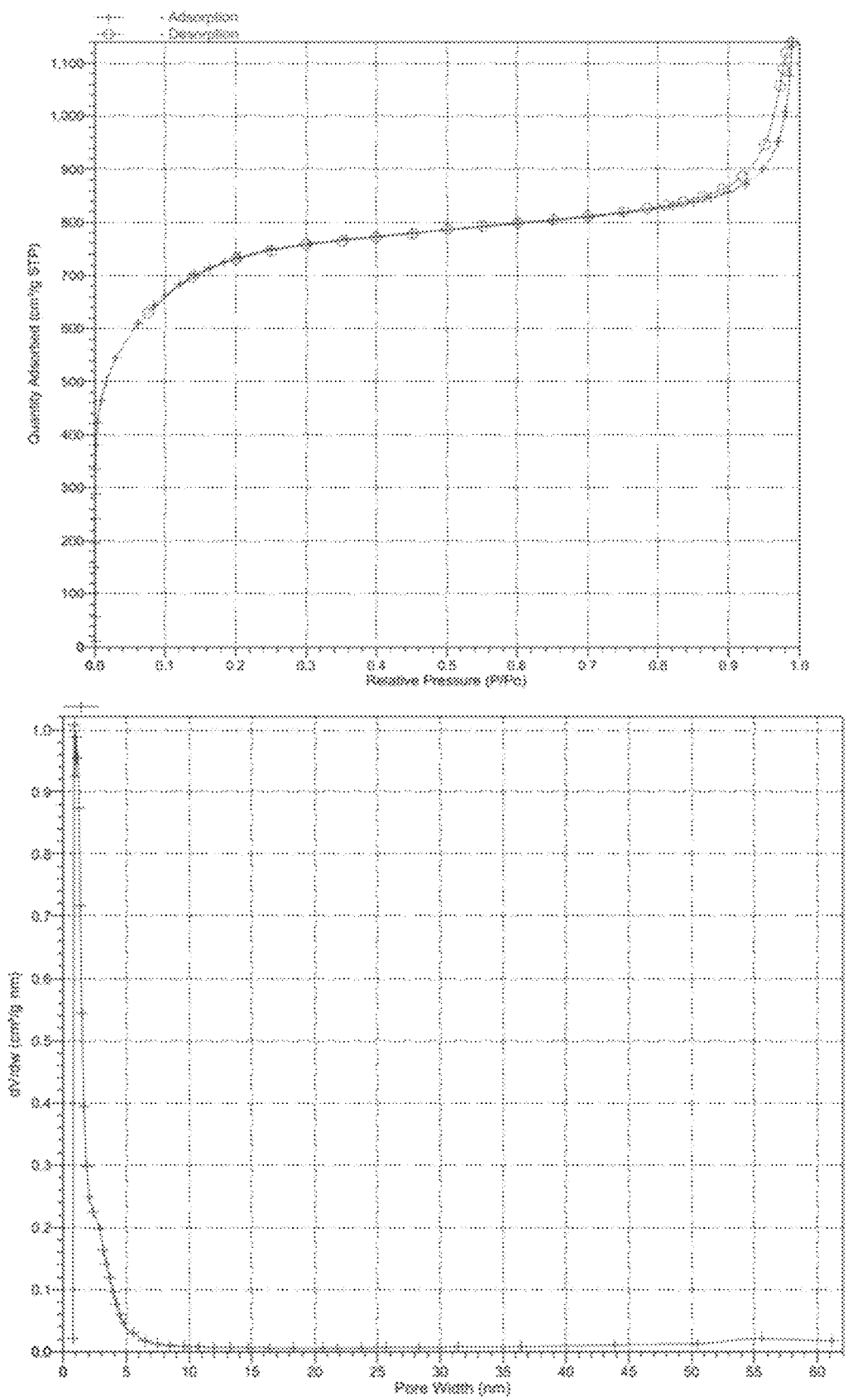
FIG. 3 shows BET analysis charts of the carbon-based porous material prepared in the Example 1, which show a $N_2$ absorption/desorption curve and a pore size distribution curve respectively.
Figure 4:
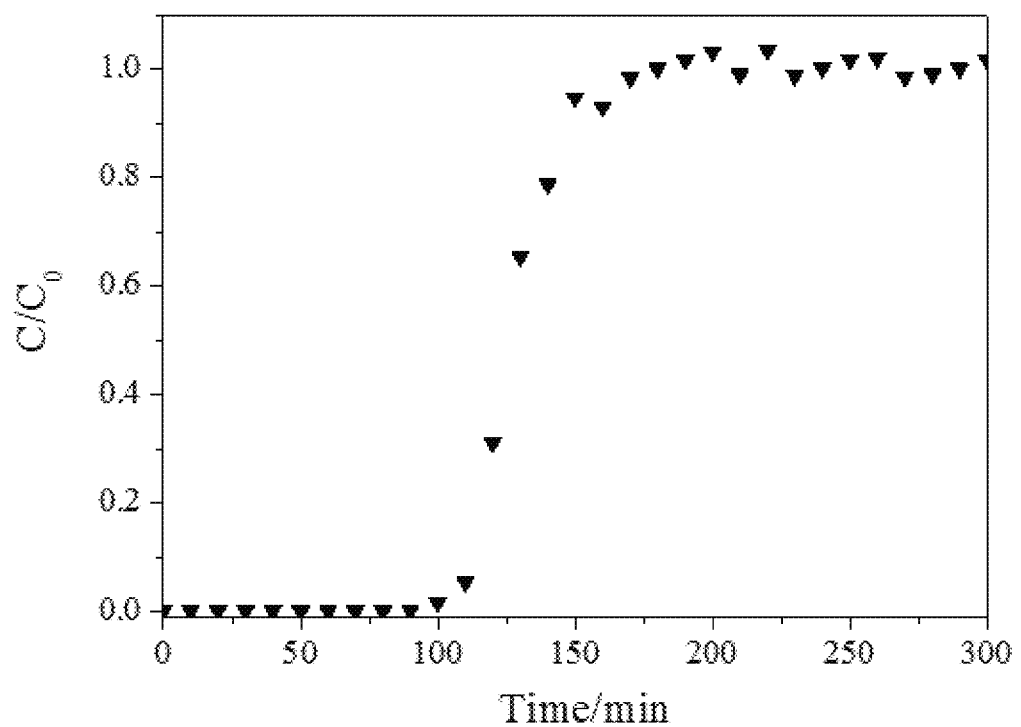
FIG. 4 shows an adsorption break-through curve of butane as adsorbed gas of the carbon-based porous material prepared in the Example 1.
Figure 5:
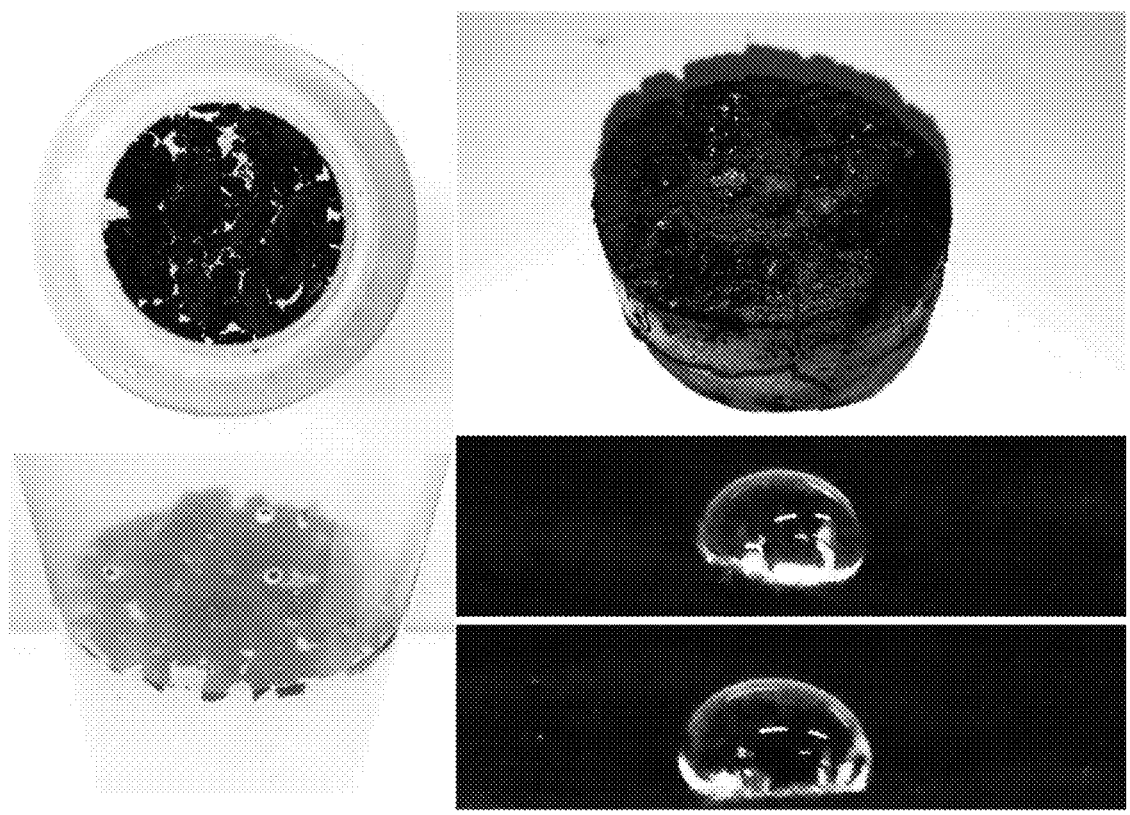
FIGS. 5 and 6 show hydrophobicity test photos of the carbon-based porous material, wherein, the photos in FIG. 5 correspond to the Example I-1 and are shot with a camera; the photos in FIG. 6 are shot with a contact angle camera, wherein, the photos on the left correspond to the Comparative Example I-1, and the photos on the right correspond to the Example I-2 (i.e., the product in the Example I-1 after hydrophobic treatment)

FIG. 1 shows SEM and TEM photos of the carbon-based porous material respectively, which respectively demonstrate that the product is in carbon black color and has 3D hierarchical porous structures in a crosslinked network form in it;

The BET analysis result in FIG. 3 shows that the specific surface area of the sample is as high as 2,305 m$^2$/g, the average pore size is 3.07 nm, the most probable pore size is 2.45 nm, and the pore volume is 1.98 m$^3$/g; the pore size distribution of the product is mainly within a range of 1~5 nm, wherein, the mesopore percentage is 71%;

FIG. 4 shows an adsorption break-through curve of butane gas, which indicates good desorption performance;

FIG. 5 shows that the product can float on water surface, has good hydrophobicity, and has 120°+1.2° wetting angle, which indicates that the carbon-based porous material has good hydrophobicity. The performance parameters are shown in Table 1.

Example I-2

150 kg ethyl acetate is mixed with 4 kg silane coupling agent (SYLGARD184 from Dow Corning) and the mixture is stirred to a homogenous state, 100 kg carbon-based porous material obtained in the example I-1 is impregnated in the mixture at 25° C. for 1 h, and then is filtered and dried at 120° C. for 5 h; thus, hydrophobic activated carbon is obtained.

Figure 6:
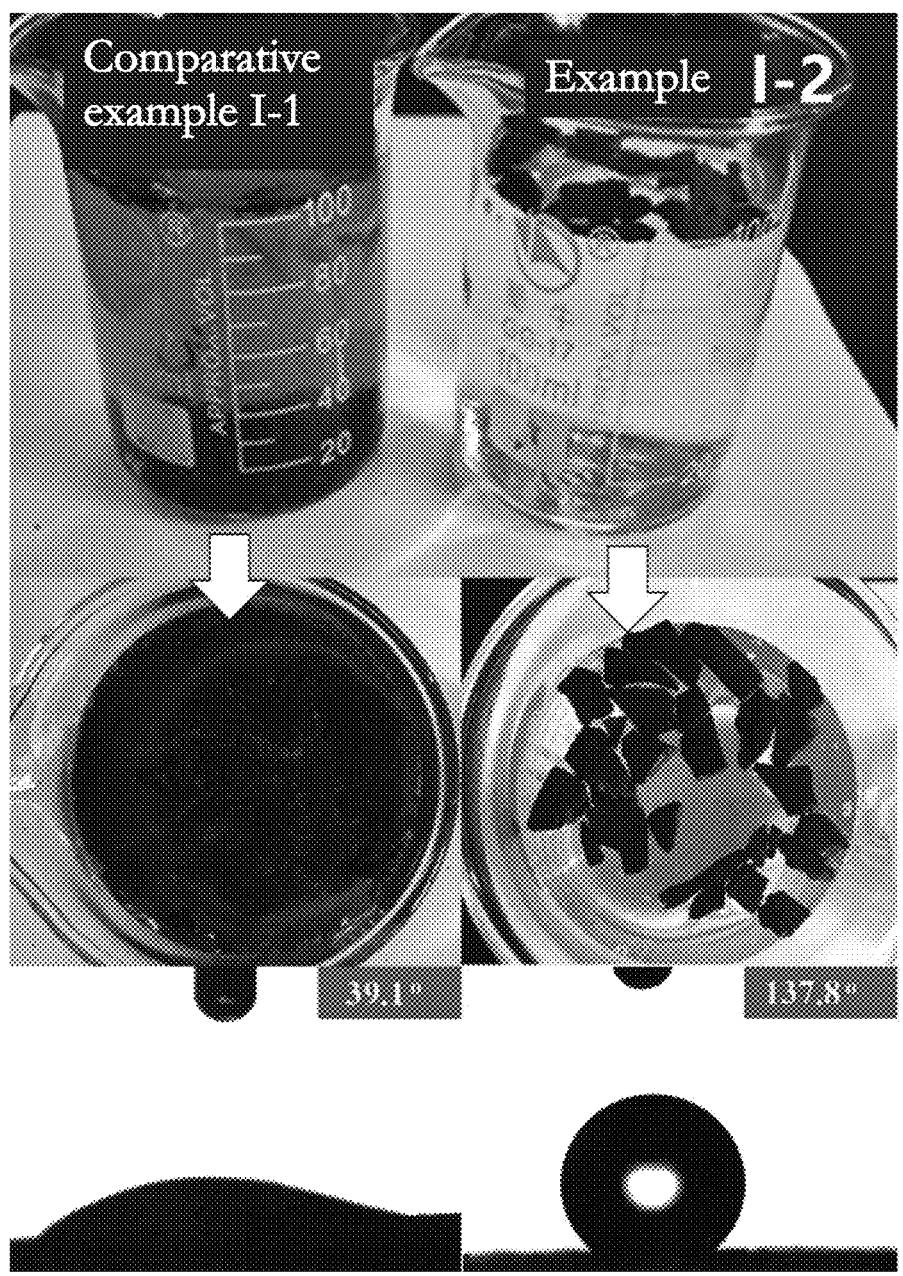

The SEM and TEM photos of the carbon-based porous material are similar to those in FIG. 1. FIG. 6 demonstrates that the hydrophobicity of the carbon-based porous material is obviously higher than the hydrophobicity of the carbon-based porous material in the example 1-1. Other performance parameters are shown in Table 1.

Example I-3

(1) 115 g pyrogallol and 170 g formaldehyde are dissolved in 300 ml deionized water, the mixture is mixed intensively, and then 4 g glacial acetic acid is added, and the solution is stirred for 15 min. to obtain a mixed solution.

(2) The mixed solution is stirred at 5,000 rpm constant speed for 24 h in 80° C. constant-temperature water bath environment, to obtain an orange gel block.

(3) The gel block is pre-frozen rapidly with liquid nitrogen for 45 s, and then is loaded into a −80° C., 10 Pa vacuum freeze drier and dried for 24 h, to obtain a dry sample. The dry sample is loaded into a tubular heating furnace, nitrogen is charged at 50 sccm charging rate, the temperature in the tubular heating furnace is increased at 5° C./min. heating rate to 800° C. and held at the temperature for 3 h under nitrogen shielding, while continuous nitrogen charging is kept.

Figure 7:
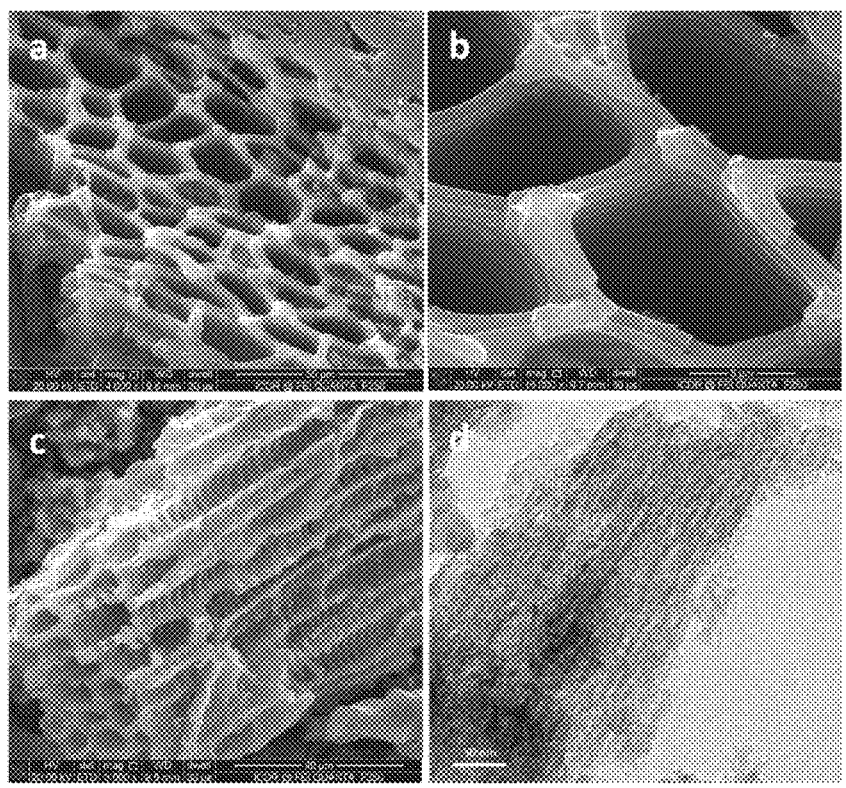
FIGS. 7 and 8 show SEM photos and TEM photos of the carbon-based porous materials prepared in the Example I-3 and I-5 respectively, wherein, a and b are SEM photos at different magnifications, c is a side-view SEM photo, and d is a TEM photo.

(4) The nitrogen charging is stopped and then is replaced with carbon dioxide charging at the same charging rate, and, at the same time, the temperature is increased at 5° C./min. heating rate to 950° C. and held at the temperature for 4 h for activation. After the activation is completed, the product is cooled to room temperature and then taken out; thus, a block of hydrophobic carbon-based porous material in an irregular block shape in dimensions of (1-2)cm×(1-2)cm×(1-5) cm is obtained. FIG. 7 shows the SEM and TEM photos of the obtained sample, which demonstrate that the product has 3D hierarchical porous structures in a crosslinked network form in it, and prove that the reproducibility of the example I-1 after scaling up is good.

The BET result shows that the specific surface area of the product obtained through shortened activation reaction is decreased to 1,809 m²/g, the average pore size is 2.57 nm, the most probable pore size is 1.61 nm, and the pore volume is 1.18 cm³/g.

The hydrophobic test result indicates that the water wetting angle of the product is 113±1.5°. The performance parameters are shown in Table 1.

Example I-4

150 kg ethyl acetate is mixed with 1 kg silane coupling agent (SYLGARD184 from Dow Corning) and the mixture is stirred to a homogenous state, 100 kg carbon-based porous material obtained in the example I-3 is impregnated in the mixture at 25° C. for 1 h, and then is filtered and dried at 120° C. for 5 h; thus, hydrophobic activated carbon is obtained.

The SEM and TEM photos of the carbon-based porous material are similar to those in FIG. 7. Other performance parameters are shown in Table 1.

Example I-5

(1) 12 g phenol and 18 g formaldehyde are dissolved in 95 ml deionized water, the mixture is mixed intensively, and then 0.45 g glacial acetic acid is added, and the solution is stirred for 20 min. to obtain a mixed solution.

(2) The mixed solution is stirred at 4,500 rpm constant speed for 48 h in 90° C. constant-temperature water bath environment, to obtain an orange gel block.

(3) The gel block is pre-frozen rapidly with liquid nitrogen for 4 s, and then is loaded into a −70° C., 5 Pa vacuum freeze drier and dried for 36 h, to obtain a dry sample. The dry sample is loaded into a tubular heating furnace, nitrogen is charged at 50 sccm charging rate, the temperature in the tubular heating furnace is increased at 7° C./min. heating rate to 600° C. and held at the temperature for 6 h under nitrogen shielding, while continuous nitrogen charging is kept.

(4) The nitrogen charging is stopped and then is replaced with carbon dioxide charging at the same charging rate, and, at the same time, the temperature is increased at 7° C./min. heating rate to 850° C. and held at the temperature for 8 h for activation. After the activation is completed, the product is cooled to room temperature and then taken out; thus, a block of carbon-based porous material in an irregular block shape in dimensions of (1-2)cm×(1-2)cm×(1-5) cm is obtained.

Figure 8:
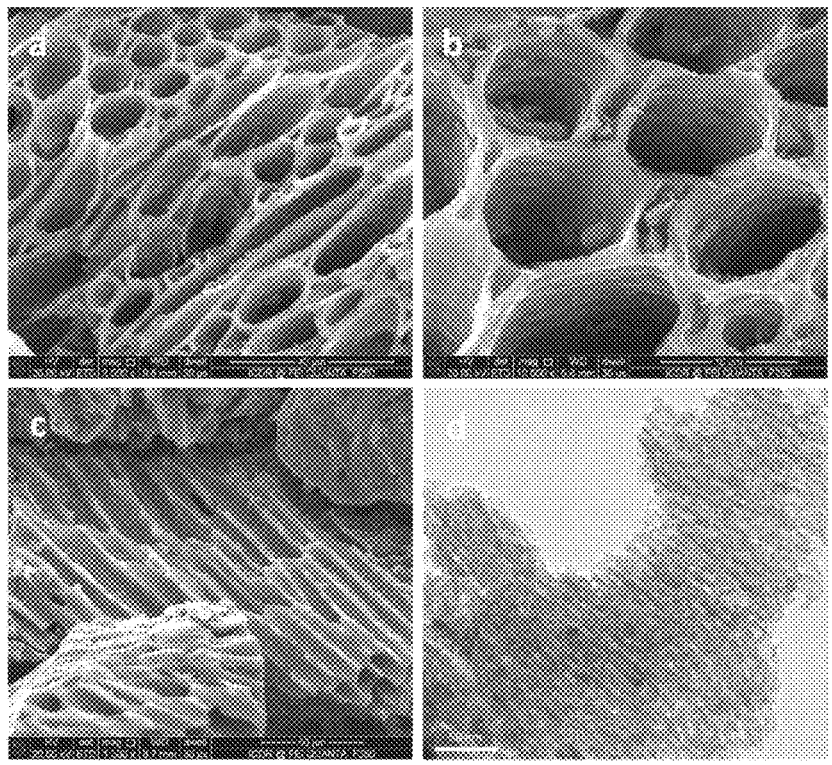

FIG. 8 shows the SEM and TEM results of the obtained sample, which demonstrate that the sample has 3D hierarchical porous structures in a crosslinked network form in it, the specific surface area is 1,509 m²/g, the most probable pore size is 2.7 nm; the hydrophobic test result indicates that the water wetting angle of the product is 121±0.6°. The performance parameters are shown in Table 1.

Example I-6

150 kg ethyl acetate is mixed coupling agent with 1 kg silane (γ-(methacryloxypropyl) trimethoxysilane) and the mixture is stirred to a homogenous state, 100 kg carbon-based porous material obtained in the example I-5 is impregnated in the mixture at 25° C. for 1 h, and then is filtered and dried at 120° C. for 5 h; thus, hydrophobic activated carbon is obtained.

The SEM and TEM photos of the carbon-based porous material are similar to those in FIG. 8. Other performance parameters are shown in Table 1.

Example I-7

(1) 9 g cresol and 15.7 g formaldehyde are dissolved in 70 ml deionized water, the mixture is mixed intensively, and then 0.45 g glacial acetic acid is added, and the solution is stirred for 30 min. to obtain a mixed solution.

(2) The mixed solution is stirred at 4,500 rpm constant speed for 12 h in 100° C. constant-temperature water bath environment, to obtain an orange gel block.

(3) The gel block is pre-frozen rapidly with liquid nitrogen for 50 s, and then is loaded into a −80° C., 3 Pa vacuum freeze drier and dried for 48 h, to obtain a dry sample. The dry sample is loaded into a tubular heating furnace, nitrogen is charged at 50 sccm charging rate, the temperature in the tubular heating furnace is increased at 9° C./min. heating rate to 780° C. and held at the temperature for 3 h under nitrogen shielding, while continuous nitrogen charging is kept.

(4) The nitrogen charging is stopped and replaced with carbon dioxide charging at the same charging rate, and, at the same time, the temperature is increased at 9° C./min. heating rate to 1,100° C. and held at the temperature for 3 h; after the activation is completed, the product is cooled to room temperature and then taken out; thus, a block of carbon-based porous material in an irregular block form in dimensions of (1-2)cm×(1-2)cm×(1-5) cm is obtained.

The SEM and TEM results of the obtained sample is similar to those in FIG. 1, and demonstrate that the sample has 3D hierarchical porous structures in a crosslinked network form in it, the specific surface area is 1,670 m²/g, the most probable pore size is 3.3 nm; the hydrophobic test result indicates that the water wetting angle of the product is 118±1.5°. The performance parameters are shown in Table 1.

Example I-8

(1) 27 g pyrocatechol and 40.5 g formaldehyde are dissolved in 200 ml deionized water, the mixture is mixed intensively, and then 0.9 g glacial acetic acid is added, and the solution is stirred for 30 min. to obtain a mixed solution.

(2) The mixed solution is stirred at 5,000 rpm constant speed for 24 h in 80° C. constant-temperature water bath environment, to obtain an orange gel block.

(3) The gel block is pre-frozen rapidly with liquid nitrogen for 40 s, and then is loaded into a −80° C., 5 Pa vacuum freeze drier and dried for 72 h, to obtain a dry sample. The dry sample is loaded into a tubular heating furnace, nitrogen is charged at 50 sccm charging rate, the temperature in the tubular heating furnace is increased at 3° C./min. heating rate to 700° C. and held at the temperature for 4 h under nitrogen shielding, while continuous nitrogen charging is kept.

(4) The nitrogen charging is stopped and then is replaced with carbon dioxide charging at the same charging rate, and, at the same time, the temperature is increased at 3° C./min. heating rate to 950° C. and held at the temperature for 5.5 h for activation. After the activation is completed, the product is cooled to room temperature and then taken out; thus, a hydrophobic carbon-based porous material is obtained.

The SEM and TEM results of the obtained sample is similar to those in FIG. 1, and demonstrate that the sample has 3D hierarchical porous structures in a crosslinked network form in it, the specific surface area is 1,311 m²/g, the most probable pore size is 3.6 nm; the hydrophobic test result indicates that the water wetting angle of the product is 119±1.2°. The performance parameters are shown in Table 1.

Comparative Example I-1

A carbon-based porous material is prepared with the method disclosed in the example I-1 in the patent document U.S. Pat. No. 4,014,817A. The obtained product is a typical microporous material, and the SEM and TEM photos of the product are shown in FIG. 2. It is seen from FIG. 2: the carbon-based porous material prepared in the comparative example I-1 has no structure of 3D hierarchical porous network. The hydrophobicity test result is shown in FIG. 6, and indicates hydrophilicity. The micropore content is high, but the mesopore content is as low as 22%. Other parameters are shown in Table 1. It is found through comparison: the butane adsorption working activity of the carbon adsorption material in the comparative example I-1 has little difference from that of the products obtained in the examples I-1~8, but the butane working capacity of the carbon adsorption material in the comparative example I-1 is lower than that of the products obtained in the examples I-1~8; the carbon adsorption material in the comparative example I-1 has high butane holding capacity, which indicates low desorption efficiency and high desorption difficulties, and relatively low effective working capacity. Besides, the high micropore content results in a great deal of adsorption heat generated in the adsorption process; consequently, the adsorbent temperature is as high as 87° C., and there is a severe safety risk. In addition, the crushing strength of the product in the comparative example I-1 is lower, which indicates that crushing and degradation may occur easily in a long-time cyclic operation process.

Example II-1

(1) 1,000 kg 600-mesh coconut shell carbon powder (obtained by coconut shell carbonization, with 488 m²/g specific surface area, 48% mesopore content, and 51% micropore content) is weighed, 80 kg wheat starch and 2,000 kg water are added while stirring to form powder slurry, the powder slurry is loaded into a stock tank, and then the stock tank is sealed and held in 20° C. room temperature environment for 2 months for fermentation, wherein, the oxygen content in the stock tank is lower than 10 vol %.

(2) 500 kg fermented coconut shell carbon powder is weighed, 80 kg water and 50 kg petroleum pitch (petroleum pitch 10 # from Shandong Qilu Petrochemical Engineering Co., Ltd) are added as a binder while stirring, the mixture is held at 60° C. fermentation temperature and stirred further for 45 min., and then is loaded into a plodder and plodded (at 10 MPa pressure and 5 cm/s plodding rate); thus, a cylindrical strip in 5 mm diameter and 1 cm length is obtained.

(3) The cylindrical strip obtained in the step (2) is loaded onto a tray and is placed on a conveyer belt, and is dried in air at 80° C. for 3 h.

(4) The temperatures in the carbonization-activation furnace are controlled in a stable state, specifically, the temperature in the carbonization section is controlled at 750° C., the temperature in the activation section is controlled at 930° C., the carbonization-activation furnace is rotated at a constant speed, the product dried in the step (3) is fed into the carbonization-activation furnace at 25 kg/h feeding rate, the product is discharged at 12 kg/h discharging rate, the processing time in the carbonization section is 10 min., and the activation time is about 120 min. The activator is water vapor, and the dose of the water vapor is about 10 kg/h.

(5) 150 kg ethyl acetate is mixed with 1 kg silane coupling agent (SYLGARD184 from Dow Corning) and the mixture is stirred to a homogenous state, 100 kg carbonized and activated product obtained in the step (4) is impregnated in the mixture at 25° C. for 1 h, and then is filtered and dried at 120° C. for 5 h; thus, hydrophobic activated carbon is obtained.

Figure 9:
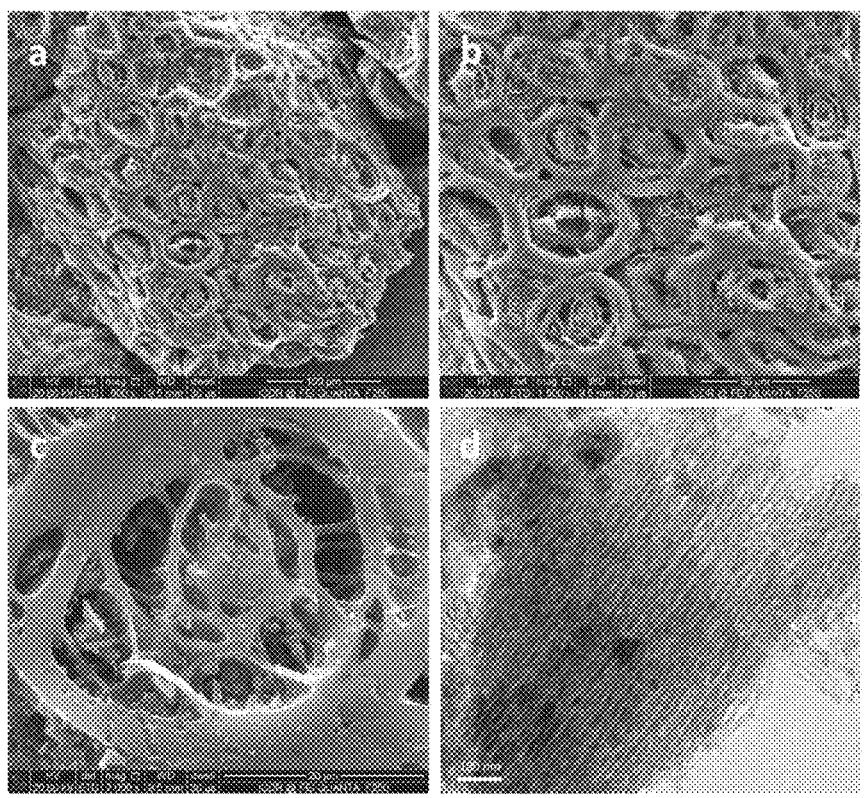
FIG. 9 shows SEM photos and a TEM photo of the carbon-based porous material prepared in the Example II-1, wherein, a, b and c are SEM photos at different magnifications respectively, and d is a TEM photo.

FIG. 9 shows SEM and TEM photos of the hydrophobic activated carbon. It is seen from the figure: the material has 3D hierarchical porous structures in a crosslinked network form in it, and has abundant hierarchical pore structures crossing each other, there are a large quantity of mesoporous-microporous structures in the macropores or on the surface.

Figure 12:
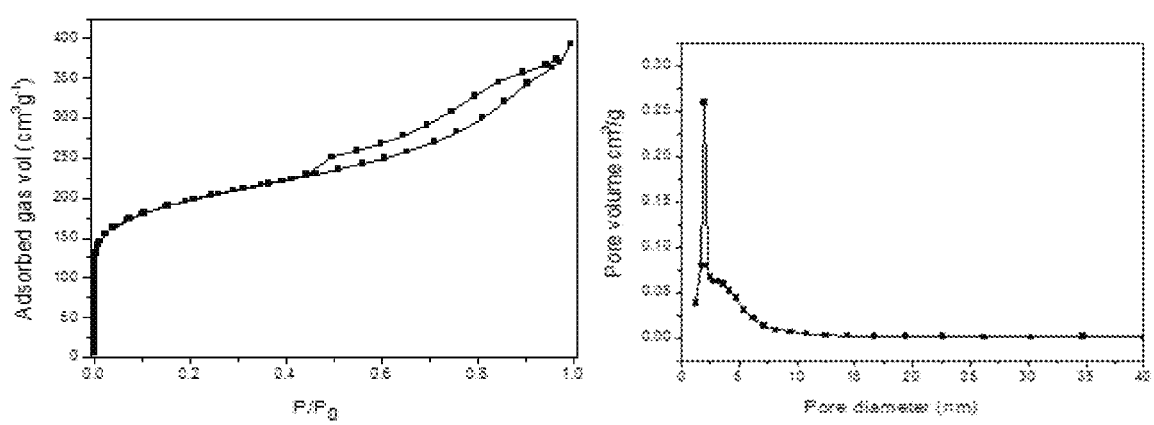
FIG. 12 shows BET analysis charts of the carbon-based porous material prepared in the Example II-1, which show an absorption/desorption curve and a pore size distribution curve respectively.

FIG. 12 shows the BET analysis charts of the hydrophobic activated carbon, which show the adsorption/desorption curve and pore size distribution curve of the sample respectively. These charts also demonstrate that the material has abundant mesoporous structures, wherein, the pore size distribution is mainly centralized within a range of 1-10 nm.

Figure 13:
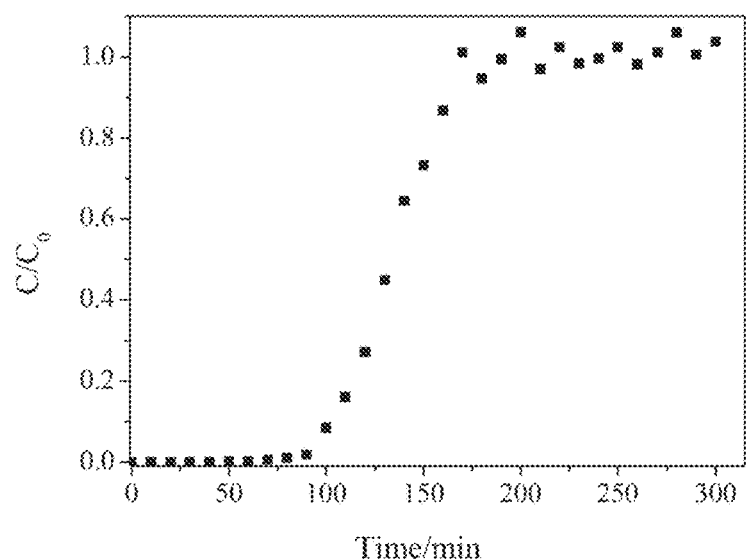
FIG. 13 shows an adsorption break-through curve of butane as adsorbed gas of the carbon-based porous material prepared in the Example II-1.

FIG. 13 shows the butane adsorption break-through curve of the hydrophobic activated carbon, and shows the situation of butane gas adsorption of 400 g activated carbon in a butane adsorption device.

Figure 14:
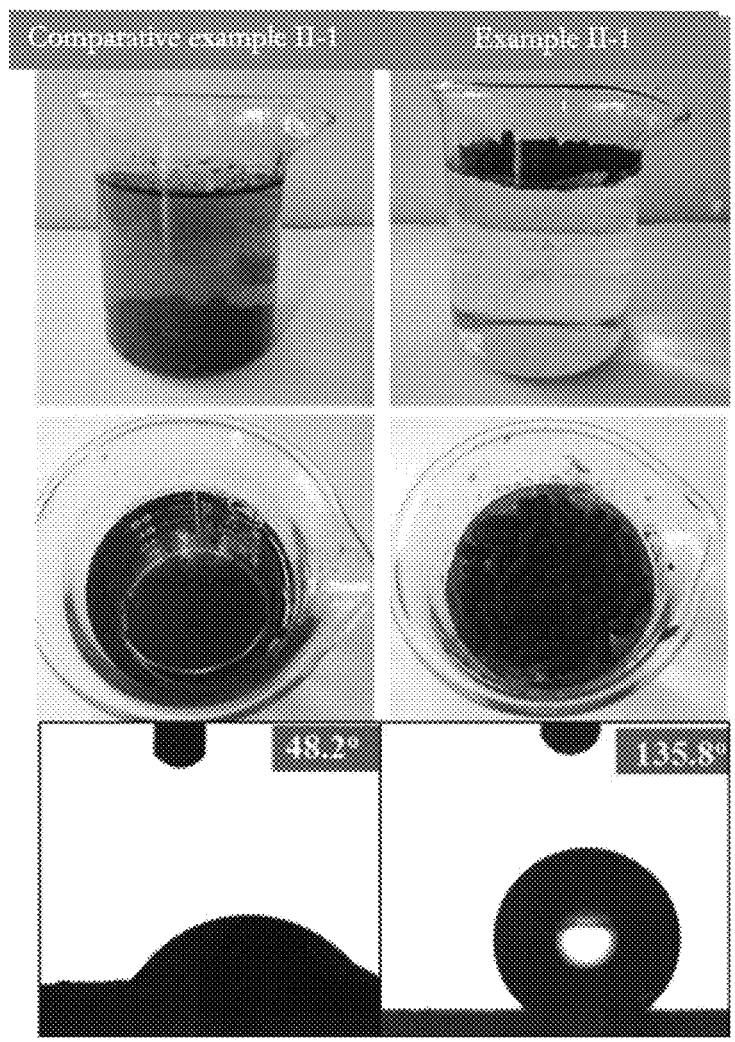
FIG. 14 shows hydrophobicity test photos of the hydrophobic carbon-based porous materials prepared in the Example II-1 and Comparative Example II-1, wherein, the photos on the left correspond to the Comparative Example II-1, and the photos on the right correspond to the Example II-1.

FIG. 14 shows diagrams of hydrophobicity test and performance comparison between the hydrophobic activated carbon product and a commercial activated carbon product. The diagrams indicate that the product has good hydrophobicity.

Other parameters are shown in Table 2.

Comparative Example II-1

SEM, TEM, and hydrophobicity test are carried out for activated carbon WS480 produced and sold by Calgon Carbon (a US company) with the methods described in the Example 1. The obtained product is a typical microporous material, and the SEM and TEM photos of the product are shown in FIG. 10. It is seen from FIG. 10: the activated carbon WS480 has no structure of 3D hierarchical porous network. The hydrophobicity test result is shown in FIG. 14, and indicates hydrophilicity. Other parameters are shown in Table 2.

Comparative Example II-2

Hydrophobic activated carbon is prepared with the method described in the example II-1, but the fermentation step is excluded; the mixture ratio of the materials and other conditions are kept unchanged. Specifically, the operations are as follows:

(1) 1,000 kg 600-mesh coconut shell carbon powder (obtained by coconut shell carbonization, with 488 m²/g specific surface area, 48% mesopore content, and 51% micropore content) is weighed, 80 kg wheat starch and 2,000 kg water are added while stirring to form powder slurry, and then 80 kg water and 50 kg petroleum pitch (petroleum pitch 10 # from Shandong Qilu Petrochemical Engineering Co., Ltd.) are added as a binder while stirring, the mixture stirred to a homogeneous state and then load into a plodder and plodded (at 10 MPa pressure and 5 cm/s plodding rate); thus, a cylindrical strip in 5 mm diameter and 1 cm length is obtained.

(2) The cylindrical strip obtained in the step (1) is loaded onto a tray and is placed on a conveyer belt, and is dried in air at 80° C. for 3 h.

(3) The temperatures in the carbonization-activation furnace are controlled in a stable state, specifically, the temperature in the carbonization section is controlled at 750° C., the temperature in the activation section is controlled at 930° C., the carbonization-activation furnace is rotated at a constant speed, the product dried in the step (2) is fed into the carbonization-activation furnace at 25 kg/h feeding rate, the product is discharged at 12 kg/h discharging rate, the processing time in the carbonization section is 10 min., and the activation time is about 120 min. The activator is water vapor, and the dose of the water vapor is about 10 kg/h.

(4) 150 kg ethyl acetate is mixed with 1 kg silane coupling agent (SYLGARD184 from Dow Corning) and the mixture is stirred to a homogenous state, 100 kg carbonized and activated product obtained in the step (3) is impregnated in the mixture at 25° C. for 1 h, and then is filtered and dried at 120° C. for 5 h; thus, hydrophobic activated carbon is obtained.

The obtained product is a typical microporous material, and the SEM and TEM photos of the product are shown in FIG. 11. It is seen from FIG. 11: the activated carbon WS480 has no structure of 3D hierarchical porous network. Other parameters are shown in Table 2.

Example II-2

(1) 1,000 kg 600-mesh coconut shell carbon powder (obtained by coconut shell carbonization, with 459 m$^2$/g specific surface area, 50% mesopore content, and 48% micropore content) is weighed, 120 kg cassava starch and 2,000 kg water are added while stirring to form powder slurry, the powder slurry is loaded into a stock tank, and then the stock tank is sealed and held in 30° C. room temperature environment for 2 months for fermentation, wherein, the oxygen content in the stock tank is lower than 10 vol %.

(2) 500 kg fermented coconut shell carbon powder is weighed, 80 kg water and 67 kg petroleum pitch (petroleum pitch 10 # from Shandong Qilu Petrochemical Engineering Co., Ltd) are added as a binder while stirring, the mixture is held at 80° C. fermentation temperature and stirred further for 60 min., and then is loaded into a plodder and plodded (at 10 MPa pressure and 5 cm/s plodding rate); thus, a cylindrical strip in 5 mm diameter and 1 cm length is obtained.

(3) The cylindrical strip obtained in the step (2) is loaded on a conveyer belt, and is dried in air at 100° C. for 3 h.

(4) The temperatures in the carbonization-activation furnace are controlled in a stable state, specifically, the temperature in the carbonization section is controlled at 780° C., the temperature in the activation section is controlled at 950° C., the carbonization-activation furnace is rotated at a constant speed, the product dried in the step (3) is fed into the carbonization-activation furnace at 35 kg/h feeding rate, the product is discharged at 15 kg/h discharging rate, the processing time in the carbonization section is about 8 min., and the activation time is about 100 min. Carbon dioxide is used as an activator, and the dose of carbon dioxide is about 12 kg/h.

(5), 150 kg ethyl acetate is mixed with 4 kg silane coupling agent (SYLGARD184 from Dow Corning) and the mixture is stirred to a homogenous state, 100 kg carbonized and activated product obtained in the step (4) is impregnated in the mixture at 35° C. for 1 h, and then is filtered and dried at 100° C. for 7 h; thus, hydrophobic activated carbon is obtained.

The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-3

(1) 1,000 kg 600-mesh wood carbon powder (obtained by pine stem carbonization, with 436 m$^2$/g specific surface area, 44% mesopore content, and 53% micropore content) is weighed, 150 kg wheat starch and 3,000 kg water are added while stirring to form powder slurry, the powder slurry is loaded into a stock tank, and then the stock tank is sealed and held in 10° C. room temperature environment for 3 months for fermentation, wherein, the oxygen content in the stock tank is lower than 10 vol %.

(2) 500 kg fermented wood carbon powder is weighed, 100 kg water and 80 kg coal tar (coal tar 10 # from Shandong Qilu Petrochemical Engineering Co., Ltd) are added as a binder while stirring, the mixture is held at 70° C. fermentation temperature and stirred further for 30 min., and then is loaded into a plodder and plodded (at 10 MPa pressure and 5 cm/s plodding rate); thus, a cylindrical strip in 5 mm diameter and 1 cm length is obtained.

(3) The cylindrical strip obtained in the step (2) is loaded onto a tray and is placed on a conveyer belt, and is dried in air at 120° C. for 2.5 h.

(4) The temperatures in the carbonization-activation furnace are controlled in a stable state, specifically, the temperature in the carbonization section is controlled at 800° C., the temperature in the activation section is controlled at 880° C., the carbonization-activation furnace is rotated at a constant speed, the product dried in the step (3) is fed into the carbonization-activation furnace at 20 kg/h feeding rate, the product is discharged at 10 kg/h discharging rate, the processing time in the carbonization section is 10 min., and the activation time is about 180 min. The dose of water vapor is about 15 kg/h.

(5) 150 kg ethyl acetate is mixed with 4 kg silane coupling agent (γ-(methacryloxypropyl) trimethoxysilane) and the mixture is stirred to a homogenous state, 100 kg carbonized and activate product obtained in the step (4) is impregnated in the mixture at 35° C. for 1 h, and then is filtered and dried at 150° C. for 3 h; thus, hydrophobic activated carbon is obtained. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-4

Hydrophobic activated carbon is prepared with the method described in the example II-1, but the dose of starch in the step (1) is 50 kg. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-5

Hydrophobic activated carbon is prepared with the method described in the example II-1, but the coconut shell carbon powder is replaced with straw carbon powder (obtained by carbonization of corn stalks, with 398 m$^2$/g specific surface area, 47% mesopore content, and 51% micropore content) in the same weight in the step (1). The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-6

Hydrophobic activated carbon is prepared with the method described in the example II-1, but the petroleum pitch is replaced with 600-mesh coal-based pitch (from Zibo Kaimeke Industrial and Trading Co., Ltd., without any treatment) in the step (2). The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-7

Hydrophobic activated carbon is prepared with the method described in the example II-1, but the dose of the binder in the step (2) is 30 kg. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-8

Hydrophobic activated carbon is prepared with the method described in the example II-1, but the dose of the binder in the step (2) is 90 kg. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-9

Hydrophobic activated carbon is prepared with the method described in the example II-1, but the activation temperature in the step (4) is 1,200° C. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-10

Hydrophobic activated carbon is prepared with the method described in the example II-1, but the dose of the activator in the step (4) is 20 kg/h. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-11

Hydrophobic activated carbon is prepared with the method described in the example II-1, but the activation time in the step (4) is 250 min. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-12

Hydrophobic activated carbon is prepared with the method described in the example II-1, but the dose of the silane coupling agent in the step (5) is 5 kg. The TEM and SEM photos of the product are similar to those of the example II-1, the material has 3D hierarchical porous structures in a crosslinked network form in it, and has abundant hierarchical pore structures crossing each other, there are a large quantity of mesoporous-microporous structures in the macropores or on the surface. Other performance parameters are shown in Table 2.

Example II-13

Hydrophobic activated carbon is prepared with the method described in the example II-1, but the silane coupling agent is replaced with vinyltriacetoxysilane in the same weight in the step (5). The TEM and SEM photos of the product are similar to those of the example II-1, the material has 3D hierarchical porous structures in a crosslinked network form in it, and has abundant super-macroporous structures crossing each other, there are a large quantity of mesoporous-microporous structures in the macropores or on the surface. Other performance parameters are shown in Table 2.

TABLE 1

| No. | Bulk density/ g/cm³ | Specific surface area/ m²/g | Mesopore content/ % | Macropore content/ % | Micropore content/ % | Pore size distribution/ nm | The most probable pore size/ nm | BJH adsorption average pore size/ nm | Ball-pan hardness number/ % | Crushing strength/ N/cm | Water contact angle/ ° | Butane adsorption activity/ g/100 g | Butane working capacity/ g/100 g | Butane desorption efficiency/ % | Adsorption heat/ °C |
|---|---|---|---|---|---|---|---|---|---|---|---|---|---|---|---|
| Example I-1 | 0.53 | 2305 | 48.7 | 3.6 | 47.7 | 1.9-3.1 | 2.45 | 5.17 | 94 | 190.5 | 120 ± 1.2 | 28.21 | 20.84 | 73.9 | 66 |
| Example I-2 | 0.55 | 2189 | 48.3 | 5.3 | 46.4 | 1.8-3.0 | 2.57 | 5.32 | 94 | 189.6 | 138 ± 1.5 | 29.35 | 21.06 | 71.8 | 67 |
| Example I-3 | 0.57 | 1809 | 53.2 | 1.2 | 45.6 | 1.5-2.7 | 1.61 | 5.02 | 96 | 187.4 | 113 ± 1.5 | 30.32 | 21.7 | 71.6 | 72 |
| Example I-4 | 0.57 | 1700 | 50.6 | 3.4 | 46 | 1.7-2.8 | 1.74 | 4.82 | 96 | 188.2 | 142 ± 0.5 | 31.1 | 22.4 | 72 | 70 |
| Example I-5 | 0.61 | 1509 | 39.7 | 4.1 | 56.2 | 1.6-2.9 | 2.7 | 4.58 | 93 | 162.7 | 121 ± 0.6 | 32.05 | 21.01 | 65.6 | 80 |
| Example I-6 | 0.59 | 1433 | 41.2 | 3.6 | 55.2 | 1.7-3.2 | 2.8 | 4.52 | 94 | 165.2 | 147 ± 1.4 | 30.2 | 20.8 | 68.9 | 77 |
| Example I-7 | 0.48 | 1670 | 55.6 | 2.2 | 42.2 | 1.8-3.5 | 3.3 | 5.85 | 91 | 192.5 | 118 ± 1.5 | 26.98 | 17.66 | 65.5 | 64 |
| Example 1-8 | 0.45 | 1311 | 39.3 | 8.3 | 52.4 | 1.9-3.7 | 3.6 | 1.83 | 95 | 190.3 | 119 ± 1.2 | 26.67 | 18.19 | 68.2 | 62 |
| Comparative Example I-1 | 0.44 | 1317 | 22 | 4.5 | 73.5 | 1.8-7.2 | 1.9 | 1.71 | 90 | 83 | 42.5 ± 0.3 | 25.5 | 13.3 | 52.2 | 87 |

TABLE 2

| No. | Bulk density/ g/cm³ | Specific surface area/ m²/g | Mesopore content/ % | Macropore content/ % | Micropore content/ % | Pore size distribution/ nm | The most probable pore size/ nm | Ball-pan hardness number/ % | Crushing strength/ N/cm | Water contact angle/ ° | Butane adsorption activity/ g/100 g | Butane working capacity/ g/100 g | Butane desorption efficiency/ % | Adsorption heat/ °C |
|---|---|---|---|---|---|---|---|---|---|---|---|---|---|---|
| Example II-1 | 0.35 | 943.6 | 45.64 | 3.72 | 50.64 | 1.7-10.0 | 1.96 | 97 | 180 | 135 ± 1.5 | 23.88 | 18.43 | 77.2 | 60.2 |
| Example II-2 | 0.39 | 827.5 | 45.55 | 4.26 | 50.19 | 1.7-5.0 | 1.87 | 95 | 185 | 137 ± 1.5 | 22.85 | 17.03 | 74.5 | 65.7 |
| Example II-3 | 0.45 | 820.4 | 42.6 | 5.18 | 52.22 | 1.7-8.0 | 2.05 | 96 | 180.7 | 138 ± 1.5 | 22.87 | 16.66 | 72.8 | 65.3 |
| Example II-4 | 0.39 | 707.3 | 47.5 | 4.33 | 48.17 | 1.7-5.0 | 1.96 | 95 | 139.7 | 131 ± 1.5 | 20.07 | 13.50 | 67.3 | 63.1 |
| Example II-5 | 0.41 | 721.41 | 47.53 | 3.97 | 48.5 | 1.6-2.9 | 1.96 | 91 | 155 | 126 ± 1.5 | 16.65 | 9.03 | 54.2 | 62.5 |
| Example II-6 | 0.42 | 769.5 | 54.3 | 3.85 | 41.85 | 1.8-7.5 | 1.89 | 93 | 142.8 | 133 ± 1.5 | 28.32 | 19.96 | 70.5 | 62.8 |
| Example II-7 | 0.39 | 757.9 | 51.3 | 4.12 | 44.58 | 2.0-10.0 | 2.22 | 86 | 105.7 | 130 ± 1.5 | 18.04 | 10.9 | 60.4 | 59.7 |
| Example II-8 | 0.40 | 756.9 | 41.1 | 4.06 | 54.84 | 1.7-6.0 | 1.88 | 89 | 117.6 | 134 ± 1.5 | 20.48 | 14.18 | 69.2 | 66.7 |
| Example II-9 | 0.39 | 710.8 | 39.1 | 5.73 | 55.17 | 1.7-10.0 | 1.96 | 93 | 135.5 | 124 ± 1.5 | 17.07 | 9.73 | 57.0 | 68.7 |
| Example II-10 | 0.41 | 689.4 | 42.71 | 5.21 | 52.08 | 1.7-6.5 | 2.12 | 94 | 151 | 137 ± 1.5 | 19.68 | 11.09 | 56.4 | 60.8 |
| Example II-11 | 0.36 | 656.9 | 48.0 | 5.34 | 46.66 | 1.7-5.0 | 1.87 | 95 | 159.4 | 126 ± 1.5 | 15.72 | 9.1 | 57.9 | 60.2 |
| Example II-12 | 0.39 | 802.1 | 51.2 | 3.21 | 45.59 | 1.7-9.0 | 2.23 | 96 | 129.6 | 116 ± 1.5 | 26.45 | 16.77 | 63.4 | 66.3 |
| Example II-13 | 0.37 | 790.8 | 49.6 | 3.37 | 47.03 | 1.7-9.0 | 2.48 | 92 | 107.5 | 113 ± 1.5 | 25.67 | 17.80 | 69.3 | 62.9 |
| Comparative Example II-1 | 0.43 | 1241 | 21 | 1.26 | 77.74 | 1.8-7.0 | 1.9 | 90 | 85 | 48 ± 1.5 | 23.8 | 11.9 | 50 | 92 |
| Comparative Example II-2 | 0.37 | 908.3 | 35.63 | 4.86 | 59.51 | 1.6-4.8 | 1.72 | 90 | 133.2 | 135 ± 1.5 | 21.25 | 11.1 | 52.2 | 72.2 |

It is seen from the results in Tables 1 and 2: the carbon-based porous material provided in the present invention has high desorption efficiency and low adsorption heat, and can effectively avoid safety accidents and effectively recover gasoline when it is used as a gasoline adsorbent.

In addition, it is found through comparison: the butane adsorption working activity of the carbon adsorption material in the comparative example II-1 has little difference from that of the products obtained in the Examples II-1~13, but the butane working capacity of the carbon adsorption material in the Comparative Example II-1 is lower than that of the products obtained in the Examples II-1~13; the carbon adsorption material in the Comparative Example II-1 has high butane holding capacity, which indicates low desorption efficiency and high desorption difficulties, and relatively low effective working capacity. Besides, the high micropore content results in a great deal of adsorption heat generated in the adsorption process; consequently, the adsorbent temperature is as high as 87° C., and there is a severe safety risk. In addition, the crushing strength of the product in the Comparative Example II-1 is lower, which indicates that crushing and degradation may occur easily in a long-time cyclic operation process.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, and such variations and combinations shall be deemed as disclosed content in the present invention and falling into the protection scope of the present invention.

The invention claimed is:

1. A method for preparing a carbon-based porous material, comprising:
   (A) uniformly mixing a composition consisting of carbon powder, a starter culture, and water and then fermenting;
   (B) mixing the fermented product with water and a binder, and then crosslinking and curing the mixture;
   (C) shaping and drying the crosslinked and cured product; and
   (D) carbonizing and activating the dried product;
      wherein the starter culture is starch;
      wherein the conditions of the crosslinking and curing include:
         temperature ranges from 50° C. to 100° C.; and time ranges from 20 min to 80 min;
      wherein the dose of the starter culture is 8-18 wt % of the carbon powder;
      wherein the conditions of fermentation include: a temperature of 10-40° C.; a fermentation time of 1-4 months; and an oxygen content of less than 10 vol %.

2. The method according to claim 1, wherein the carbon powder is at least one of coconut shell carbon powder, wood carbon powder, bamboo carbon powder, lotus root carbon powder, and straw carbon powder.

3. The method according to claim 1, wherein the dose of water is 1-3 times of the total weight of the organic matter and the carbon powder.

4. The method according to claim 3, wherein the dose of water is 1.5-2.5 times of the total weight of the organic matter and the carbon powder.

5. The method according to claim 1, wherein the weight ratio of the product obtained through fermentation to the binder to the water is 100:5-20:10-35.

6. The method according to claim 5, wherein the weight ratio of the product obtained through fermentation to the binder to the water is 100:8-18:15-25.

7. The method according to claim 1, wherein, the activator used in the carbonization-activation is water vapor and/or carbon dioxide gas at 150-200° C., and, in relation to 100 g dried product, the dose of the activator is 10-100 g.

8. The method according to claim 1, wherein the starch is at least one of mung bean starch, cassava starch, sweet potato starch, Spanish potato starch, potato starch, wheat starch, water caltrop starch, lotus root starch, and maize starch.

* * * * *